US011591018B2

(12) United States Patent
Maruoka et al.

(10) Patent No.: US 11,591,018 B2
(45) Date of Patent: Feb. 28, 2023

(54) PARKING ASSISTANCE DEVICE

(71) Applicant: AISIN CORPORATION, Kariya (JP)

(72) Inventors: Tetsuya Maruoka, Okazaki (JP); Kazuya Watanabe, Anjo (JP); Kinji Yamamoto, Anjo (JP); Itsuko Fukushima, Nagoya (JP); Takayuki Nakasho, Anjo (JP)

(73) Assignee: AISIN CORPORATION, Kariya (JP)

( * ) Notice: Subject to any disclaimer, the term of this patent is extended or adjusted under 35 U.S.C. 154(b) by 276 days.

(21) Appl. No.: 16/754,436

(22) PCT Filed: Oct. 5, 2018

(86) PCT No.: PCT/JP2018/037479
§ 371 (c)(1),
(2) Date: Apr. 8, 2020

(87) PCT Pub. No.: WO2019/073938
PCT Pub. Date: Apr. 18, 2019

(65) Prior Publication Data
US 2020/0346690 A1 Nov. 5, 2020

(30) Foreign Application Priority Data

Oct. 10, 2017 (JP) .............................. JP2017-197171
Oct. 12, 2017 (JP) .............................. JP2017-198847

(51) Int. Cl.
*B62D 13/06* (2006.01)
*G06T 1/00* (2006.01)
(52) U.S. Cl.
CPC ............ *B62D 13/06* (2013.01); *G06T 1/0007* (2013.01)
(58) Field of Classification Search
CPC ................. B60W 30/00; B60W 10/18; B60W 30/18036; B60W 50/14; B60W 10/04;
(Continued)

(56) References Cited

U.S. PATENT DOCUMENTS 6,765,607 B2 * 7/2004 Mizusawa ............... B60R 1/003
348/118
8,070,176 B1 * 12/2011 Su ......................... B62D 25/209
280/406.1
(Continued)

FOREIGN PATENT DOCUMENTS

DE 10 2008 046 544 A1 5/2009
DE 102010032411 A1 * 2/2012 ............... B60R 1/00
(Continued)

OTHER PUBLICATIONS

International Search Report for PCT/JP2018/037479, dated Dec. 25, 2018.

*Primary Examiner* — Abderrahim Merouan
(74) *Attorney, Agent, or Firm* — Sughrue Mion, PLLC

(57) ABSTRACT

A parking assistance device includes an overhead image generation unit generating an overhead image from a captured image obtained by capturing an image around a towing vehicle, a towing determination unit determining whether a towed vehicle is towed, an overhead image display range setting unit selecting a trimming range from a plurality of display ranges at least including a first display range and a second display range wider than the first display range, and a display image generation unit generating an overhead image for display by trimming the trimming range of the overhead image, and a display image including the overhead image for display on which the towing vehicle is superimposed. The overhead image display range setting unit selects the first display range when the towing vehicle does not tow the towed vehicle, and selects the second display range when the towing vehicle tows the towed vehicle.

16 Claims, 19 Drawing Sheets

(58) Field of Classification Search
CPC .. B60W 50/0097; B60W 30/02; B60W 10/20; B60W 2300/14; B60W 2050/143; B60W 2540/215; B60W 2050/146; B60W 540/18; B60W 2520/22; B60D 1/245; B60D 1/62; B62D 15/027; B62D 13/06; B62D 15/0275; B60R 1/003; B60R 2300/808; B60R 2300/70; B60R 99/00; H04N 7/181; H04N 7/183; H04N 7/18; G01B 7/30; G01B 11/26; G06T 1/0007

See application file for complete search history.

(56) References Cited

U.S. PATENT DOCUMENTS

| | | | | |
|---|---|---|---|---|
| 10,496,892 | B2* | 12/2019 | Son | G06V 10/10 |
| 10,721,397 | B2* | 7/2020 | Ali | H04N 5/23238 |
| 10,730,553 | B2* | 8/2020 | Raad | B62D 13/005 |
| 10,733,757 | B2* | 8/2020 | Gupta | B60D 1/245 |
| 10,793,069 | B2* | 10/2020 | Ward | H04N 5/247 |
| 10,863,335 | B2* | 12/2020 | Koravadi | B60D 1/62 |
| 2008/0044061 | A1 | 2/2008 | Hongo | |
| 2010/0171828 | A1 | 7/2010 | Ishii | |
| 2011/0001825 | A1 | 1/2011 | Hahn | |
| 2011/0210530 | A1* | 9/2011 | Hancock | B60D 1/02 280/506 |
| 2014/0036063 | A1 | 2/2014 | Kim et al. | |
| 2014/0085472 | A1* | 3/2014 | Lu | B60R 1/00 348/148 |
| 2014/0200759 | A1* | 7/2014 | Lu | G06T 7/246 701/28 |
| 2014/0267688 | A1* | 9/2014 | Aich | B60W 30/00 348/113 |
| 2016/0167583 | A1* | 6/2016 | Schrepfer | B60R 1/00 348/148 |
| 2017/0140228 | A1 | 5/2017 | Lang et al. | |
| 2017/0158134 | A1* | 6/2017 | Shigemura | G06T 3/00 |
| 2020/0346690 | A1* | 11/2020 | Maruoka | B62D 13/06 |

FOREIGN PATENT DOCUMENTS

| | | |
|---|---|---|
| JP | 2008-149764 A | 7/2008 |
| JP | 2012-061986 A | 3/2012 |
| JP | 2016-013793 A | 1/2016 |
| JP | 2016-530150 A | 9/2016 |

* cited by examiner

PARKING ASSISTANCE DEVICE

CROSS-REFERENCE TO RELATED APPLICATIONS

This application is national stage application of International Application No. PCT/JP2018/037479, filed Oct. 5, 2018, which designates the United States, incorporated herein by reference, and which claims the benefit of priority from Japanese Patent Application No. 2017-197171, filed Oct. 10, 2017, and Japanese Patent Application No. 2017-198847, filed on Oct. 12, 2017, the entire contents of which are incorporated herein by reference.

TECHNICAL FIELD

Embodiments of the present invention relate to a parking assistance device.

BACKGROUND ART

A parking assistance device for assisting parking of a vehicle has been known. The parking assistance device generates, for example, an overhead image in which a viewpoint is converted from a plurality of captured images around a vehicle captured by a plurality of imaging devices directed in different directions, and displays a display image including the overhead image on a display device. When such a parking assistance device is mounted on a towing vehicle that tows a towed vehicle, an area around the vehicle is blocked by the towed vehicle, and an area seen by the overhead image is narrow. Therefore, the parking assistance device that generates the overhead image by the captured image in which the area blocked by the towed vehicle is small among the plurality of captured images is disclosed.

CITATION LIST

Patent Literature

Patent Document 1: Japanese Laid-open Patent Publication No. 2008-149764

SUMMARY OF INVENTION

Problem to be Solved by the Invention

However, in the above-described parking assistance device, in the case where the vehicle tows the towed vehicle and the vehicle does not tow the towed vehicle, if the same overhead image is displayed in the area in the real world, when the towed vehicle is towed and an overall length of the vehicle in the front-rear direction is long, there is a problem in that the periphery (for example, rear periphery) of the towed vehicle cannot be seen without being included in the overhead image.

The present invention has been made in view of the above circumference, and an object of the present invention provides a parking assistance device capable of displaying a display image in which the periphery of a towed vehicle is easily visible even when the towed vehicle is towed.

Means for Solving Problem

In order to solve the above problem and achieve the object, a parking assistance device according to an embodiment of the present invention includes an overhead image generation unit that generates an overhead image from a captured image obtained by capturing an image around a towing vehicle; a towing determination unit that determines whether the towing vehicle tows a towed vehicle; an overhead image display range setting unit that selects a trimming range from a plurality of display ranges at least including a first display range and a second display range wider than the first display range; and a display image generation unit that generates an overhead image for display by trimming the trimming range of the overhead image, and generates a display image including the overhead image for display on which the image of the towing vehicle is superimposed, wherein the overhead image display range setting unit selects the first display range when the towing determination unit determines that the towing vehicle does not tow the towed vehicle, and selects the second display range when the towing determination unit determines that the towing vehicle tows the towed vehicle.

Thus, a parking assistance device according to an embodiment generates an overhead image for display by trimming an overhead image over a wider range, for example, in a case where a towed vehicle is towed than in a case where the towed vehicle is not towed. Thereby, the parking assistance device can display a display image using the overhead image for display including a wider area in the real world in the case where the towed vehicle is towed than when the towed vehicle is not towed. As a result, the parking assistance device can provide the display image in which the periphery of the towed vehicle is easily visible even when the entire vehicle is long by towing the towed vehicle.

In the parking assistance device according to the embodiment, the overhead image display range setting unit may select the trimming range from the plurality of display ranges at least including the first display range and the second display range wider than the first display range in a left-right direction of the towing vehicle.

Thereby, the parking assistance device according to the embodiment can provide a passenger with the display image including the overhead image for display in which left and right periphery of the towing vehicle are more easily visible, for example, even when the towing vehicle is turning.

In the parking assistance device according to the embodiment, the overhead image display range setting unit may set a center of the trimming range at a first front-rear position behind a center of the overhead image when the overhead image display range setting unit selects the second display range and the towing vehicle moves backward, for example.

Thereby, the parking assistance device according to the embodiment can more easily see the display image by, for example, the overhead image for display that includes more rear images in a traveling direction.

In the parking assistance device according to the embodiment, the overhead image display range setting unit may set the center of the trimming range at a second front-rear position in front of the center of the overhead image when the overhead image display range setting unit selects the second display range and the towing vehicle moves forward, for example.

Thereby, the parking assistance device according to the embodiment can more easily see the display image by, for example, the overhead image for display that includes more front images in a traveling direction.

In the parking assistance device according to the embodiment, the overhead image display range setting unit may set the center of the trimming range at the second front-rear position in front of the center of the overhead image when the overhead image display range setting unit selects the second display range, a parking mode for setting a target parking position and assisting parking is set, and the towing vehicle moves forward, and the display image generation unit may superimpose an image of the target parking position on the overhead image for display when the parking mode is set, for example.

Thereby, the parking assistance device according to the embodiment can provide the display image in which a forward direction that is the traveling direction and a target parking position is easily visible by, for example, the overhead image for display on which an image of a parking target position including more front images in the traveling direction is superimposed.

In the parking assistance device according to the embodiment, the overhead image display range setting unit may set the center of the trimming range at the first front-rear position behind the center of the overhead image when the overhead image display range setting unit selects the second display range, a parking mode for setting a target parking position and assisting parking is set, and the towing vehicle moves backward, and the display image generation unit may superimpose an image of the target parking position on the overhead image for display when the parking mode is set, for example.

Thereby, the parking assistance device according to the embodiment can provide the display image in which a rearward direction that is the traveling direction and a target parking position is easily visible by, for example, the overhead image for display on which an image of a parking target position including more rear images in the traveling direction is superimposed.

In the parking assistance device according to the embodiment, the overhead image display range setting unit may set the center of the trimming range closer to the target parking position selected within the overhead image, in a left-right direction when the overhead image display range setting unit selects the second display range, and the target parking position is selected, for example.

Thereby, the parking assistance device according to the embodiment can provide the display image in which the traveling direction and the vicinity of the selected target parking position are more easily visible and a positional relationship between the towing vehicle, the towed vehicle and, the target parking position is easily grasped by, for example, the overhead image for display on which the target position image including more images on the selected target parking position side is superimposed.

In the parking assistance device according to the embodiment, the display image generation unit may generate the display image including a peripheral image in a traveling direction of the front-rear direction of the towing vehicle, together with the overhead image for display, for example.

Thereby, the parking assistance device according to the embodiment can provide the display image in which the situation of the traveling direction is easily visible even when one area of the front or the rear of the overhead image for display increases and the other area thereof decreases by, for example, moving the trimming range forward and backward within the overhead image.

In the parking assistance device according to the embodiment, the display image generation unit may determine whether the towed vehicle is detected based on a determination result of the towing determination unit, and determines and displays a display mode of an index indicating a state of the towing vehicle or the towed vehicle according to the determination result, for example.

Thereby, the parking assistance device according to the embodiment makes it easier for a driver to grasp the current control state and the like, for example, because it is specified whether the towed vehicle can be recognized.

In the parking assistance device according to the embodiment, the display image generation unit may not display the index when the towing determination unit does not recognize the towed vehicle, for example.

Thereby, the parking assistance device according to the embodiment makes it easier for a driver to intuitively recognize, for example, a state (for example, disconnected state, lost state, or the like) in which the towed vehicle cannot be recognized.

In the parking assistance device according to the embodiment, when the towing vehicle moves backward based on a steering angle of the towing vehicle, the display image generation unit may superimpose and display, as the index, a movement position prediction line based on a current steering angle of the towing vehicle, on the captured image, and make a display mode of the movement position prediction line different between a time when the towed vehicle is recognized and a time when the towed vehicle is not recognized, for example.

Thereby, the parking assistance device according to the embodiment makes it easier for a driver to intuitively recognize a state (for example, disconnected state, lost state, or the like) in which the towed vehicle cannot be recognized because a display mode of a movement position prediction line as an index indicating the state of the towing vehicle that is easy to attract attention changes between when the towed vehicle is recognized and when the towed vehicle is not recognized, for example, in the case where the towing vehicle moves backward.

In the parking assistance device according to the embodiment, when displaying, as the index, a vehicle mark indicating the towed vehicle, the display image generation unit may superimpose and displays the vehicle mark in a display corresponding position of the towed vehicle in a vehicle peripheral image based on an image around the towing vehicle, for example.

Thereby, the parking assistance device according to the embodiment easily recognizes whether there is the towed vehicle, a connection angle when the towed vehicle is connected to the towing vehicle, and the like by checking a position where the index is to be displayed on a vehicle peripheral image because the state of the towed vehicle can be checked from the image of the towed vehicle included in the vehicle peripheral image even when the driver can understand that the towed vehicle is not recognized by control using the display mode of the index, for example, in the case where the recognition unit cannot recognize the towed vehicle.

DESCRIPTION OF EMBODIMENTS

Figure 1:
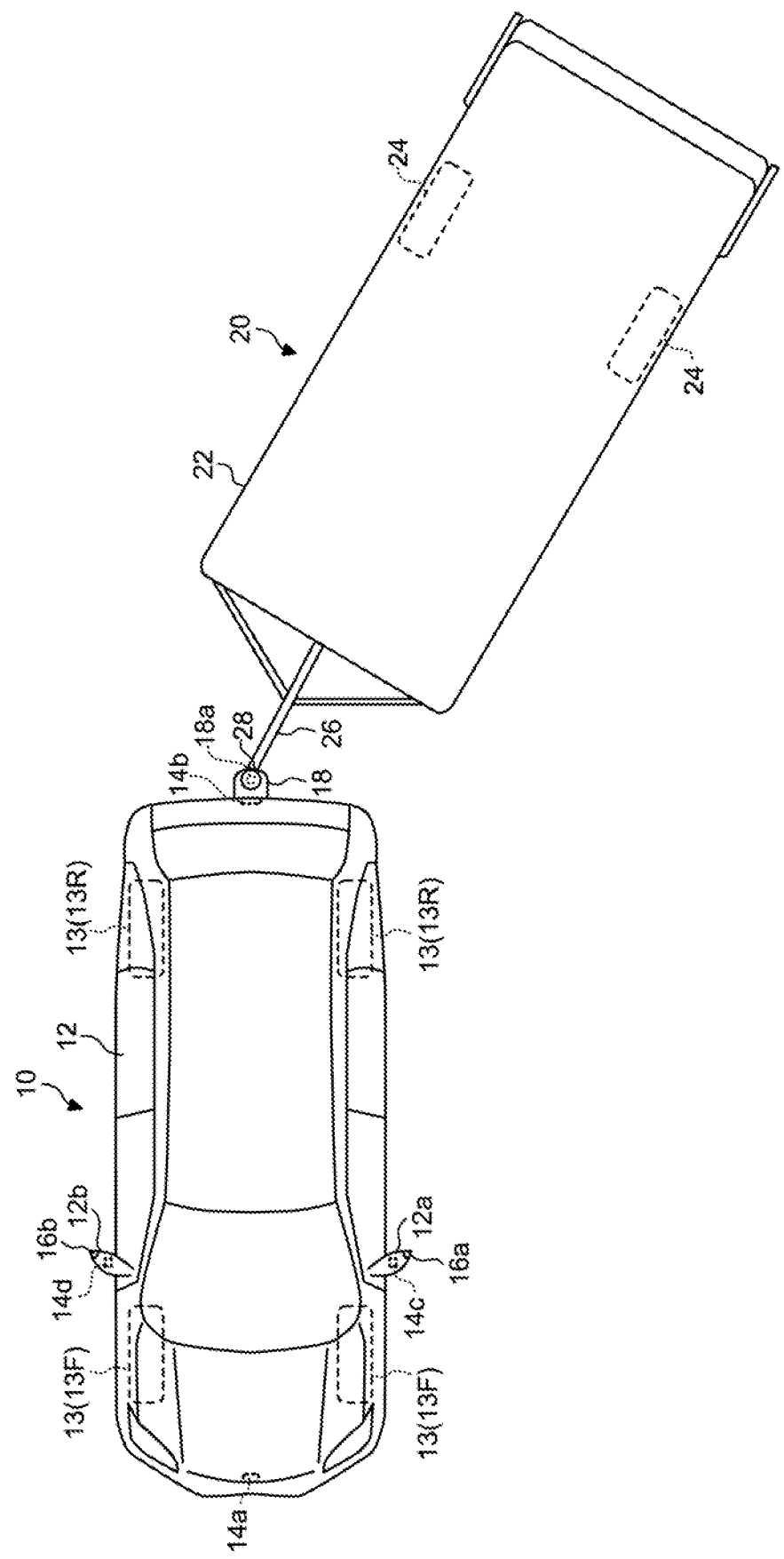
FIG. 1 is an exemplary plan view of a towing vehicle and a towed vehicle on which a parking assistance device according to first and second embodiments is mounted.

The same components as in the following exemplary embodiments and the like are denoted by the same reference numerals, and redundant description thereof will be appropriately omitted. Note that in the following embodiments, a parking assistance device may be treated as a peripheral monitor device. In addition, the parking assistance system may be referred to as a peripheral monitoring system.

First Embodiment

FIG. 1 is an exemplary plan view of a towing vehicle 10 and a towed vehicle 20 on which a parking assistance device according to a first (second) embodiment is mounted. The towing vehicle 10 is also called a tractor, and is configured to be able to travel while towing the towed vehicle 20. The towing vehicle 10 may be, for example, an automobile having driving sources such as an internal combustion engine (for example, engine) or an electric motor (for example, motor), or an automobile (for example, hybrid automobile) having both the internal combustion engine and the electric motor. In addition, the towing vehicle 10 can be mounted with various transmissions, and can be mounted with various devices necessary for driving the internal combustion engine or the electric motor. In addition, the type, number, layout, and the like of devices related to driving of a wheel 13 in the towing vehicle 10 can be set variously.

As illustrated in FIG. 1, the towing vehicle 10 has a vehicle body 12, four wheels 13, one or a plurality (four in the present embodiment) of imaging units 14a, 14b, 14c, and 14d, direction indicators 16a and 16b, and a traction device 18. When it is not necessary to distinguish between the imaging units 14a, 14b, 14c, and 14d, these imaging units 14a, 14b, 14c, and 14d are described as an imaging unit 14. When it is not necessary to distinguish the direction indicators 16a and 16b, these direction indicators 16a and 16b are described as a direction indicator 16.

The vehicle body 12 constitutes a passenger compartment in which a driver and passengers get. The vehicle body 12 accommodates or holds the wheels 13, the imaging unit 14, and the like, together with the parking assistance device described later.

The four wheels 13 are provided on the front, rear, left and right of the vehicle body 12. For example, the two front wheels 13 (front wheels 13F) function as a wheel turning mechanism, and the two rear wheels 13 (rear wheels 13R) function as a driving wheel. The driving wheel may be the front wheel 13F, or both the front wheel 13F and the rear wheel 13R.

The imaging unit 14 is, for example, a digital camera including imaging elements such as a charge coupled device (CCD) or a CMOS image sensor (CIS). The imaging unit 14 outputs moving image or still image data including a plurality of frame images generated at a predetermined frame rate as captured image data. Each of the imaging units 14 has a wide angle lens or a fisheye lens, and can capture an image in a horizontal direction, for example, in a range of 140° to 220°. An optical axis of the imaging unit 14 is set to be oblique downward. Accordingly, the imaging unit 14 outputs captured image data obtained by capturing an image around the towing vehicle 10 including a road surface.

The imaging unit 14 is provided around the vehicle body 12. For example, the imaging unit 14a is provided at a central portion (for example, front bumper) of a front end portion of the vehicle body 12 in a left-right direction. The imaging unit 14a generates a captured image obtained by capturing an image of a peripheral area in front of the towing vehicle 10. The imaging unit 14b is provided at a central portion (for example, wall portion below a rear hatch) of a rear end portion of the vehicle body 12 in a left-right direction. The imaging unit 14b generates a captured image obtained by capturing an image of a peripheral area behind the towing vehicle 10. The imaging unit 14c is provided substantially at a central portion (for example, left mirror 12a) of a left end portion of the vehicle body 12 in a front-rear direction. The imaging unit 14c generates a captured image obtained by capturing an image of a peripheral area on the left of the towing vehicle 10. The imaging unit 14d is provided substantially at a central portion (for example, right mirror 12b) of a right end portion of the vehicle body 12 in the front-rear direction. The imaging unit 14d generates a captured image obtained by capturing an image of a peripheral area on the right of the towing vehicle 10.

The direction indicators 16a and 16b are provided on the left (for example, left mirror 12a) and the right (for example, right mirror 12b) of the vehicle body 12. The direction indicator 16 has a light emitting device such as a light emitting diode (LED). The direction indicator 16 lights up to notify the peripheral vehicles of the traveling direction of the towing vehicle 10.

The traction device 18 is a device called a hitch. The traction device 18 is provided at the central portion of the vehicle body 12 in the left-right direction. The traction device 18 protrudes rearward from the rear end portion of the vehicle body 12. The traction device 18 has, for example, a spherical hitch ball 18a provided at an upper end portion of a columnar member vertically standing.

The towed vehicle 20 is also called a trailer, and travels while being towed by the towing vehicle 10. The towed vehicle 20 includes a main body 22, a plurality (two in this embodiment) of trailer wheels 24, a connection unit member 26, and a coupler 28.

The main body 22 is formed in, for example, a rectangular parallelepiped box shape. The main body 22 is configured in a hollow shape so that luggage and the like can be loaded therein. Note that the main body 22 may be a plate-shaped flat type.

The trailer wheels 24 are provided on the left and right of the main body 22, respectively. The trailer wheel 24 is, for example, a driven wheel. The trailer wheel 24 may be the driving wheel connected to the driving source such as the engine, or a wheel turning mechanism that can be steered in the left-right direction by the steering wheel or the like.

The connection unit member 26 is provided at the central portion of the main body 22 in the left-right direction. The connection unit member 26 extends forward from the front end portion of the main body 22.

The coupler 28 is provided at the front end portion of the connection unit member 26. The coupler 28 is provided with a spherical concave portion that covers the hitch ball 18a. The coupler 28 covers the hitch ball 18a, and as a result, the towed vehicle 20 is pivotally connected to the towing vehicle 10.

Figure 2:
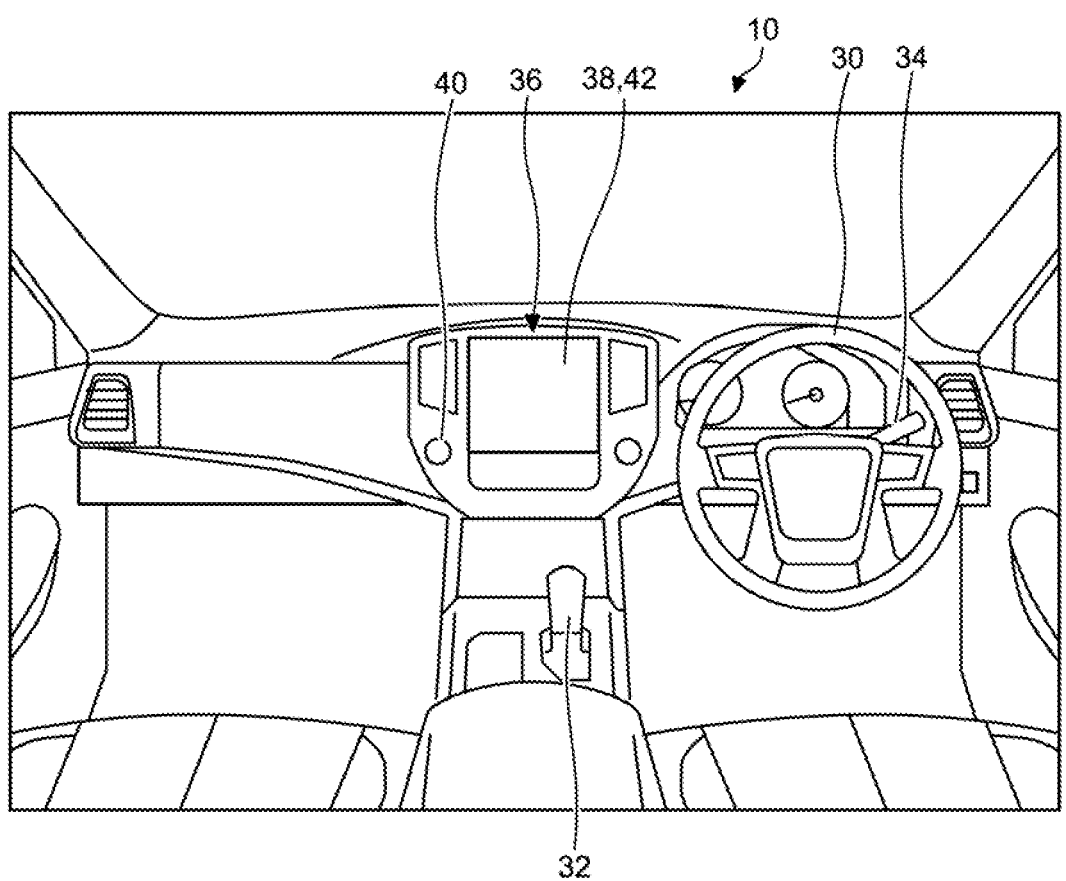
FIG. 2 is an exemplary schematic diagram of the vicinity of a dashboard in a passenger compartment of the towing vehicle according to the first and second embodiments.

FIG. 2 is an exemplary schematic diagram near the dashboard in the passenger compartment of the towing vehicle 10 according to the first embodiment (second embodiment). As illustrated in FIG. 2, the towing vehicle 10 further includes a steering unit 30, a transmission unit 32, a direction indication switch 34, and a monitor device 36.

The steering unit 30 is a device operated by a driver to steer the front wheel 13 to change the traveling direction of the towing vehicle 10. The steering unit 30 is, for example, a steering wheel or a handle that protrudes from a center console and is provided in front of a driver's seat.

The transmission unit 32 includes, for example, a shift lever or the like that protrudes from the center console, and is a device that changes a change gear ratio of the towing vehicle 10 or the traveling direction (drive and reverse) after and before the towing vehicle 10 and the parking of the towing vehicle 10.

The direction indication switch 34 is a member operated by a driver to operate left and right direction indicators (that is, turn signal). The direction indication switch 34 is, for example, a lever-shaped member that is provided on an outer peripheral portion of the steering unit 30.

The monitor device 36 is provided on the dashboard or the like in the passenger compartment of the towing vehicle 10.

The monitor device 36 includes a display unit 38, a voice output unit 40, and an operation input unit 42.

The display unit 38 is, for example, a display device such as a liquid crystal display (LCD) or an organic electroluminescent display (OELD). The display unit 38 displays an image such as a route guide of a navigation system and a display image including an overhead image at the time of parking assistance.

The voice output unit 40 is, for example, a speaker. The voice output unit 40 outputs a voice or the like for guiding a driver in the navigation.

The operation input unit 42 receives an input of a passenger. The operation input unit 42 is, for example, a touch panel. The operation input unit 42 is provided on a display screen of the display unit 38. The operation input unit 42 is configured to transmit an image displayed by the display unit 38. Thereby, the operation input unit 42 can allow a passenger to visually recognize the image displayed on the display screen of the display unit 38. The operation input unit 42 receives an instruction input by allowing a passenger to touch a position corresponding to the image displayed on the display screen of the display unit 38. For example, the operation input unit 42 receives, from the passenger, instructions including a mode switching instruction such as a towing mode, an instruction to start parking assistance, a selection instruction to select a target parking position, and the like. Note that the operation input unit 42 is not limited to the touch panel, and may be a hard switch such as a push button type.

Figure 3:
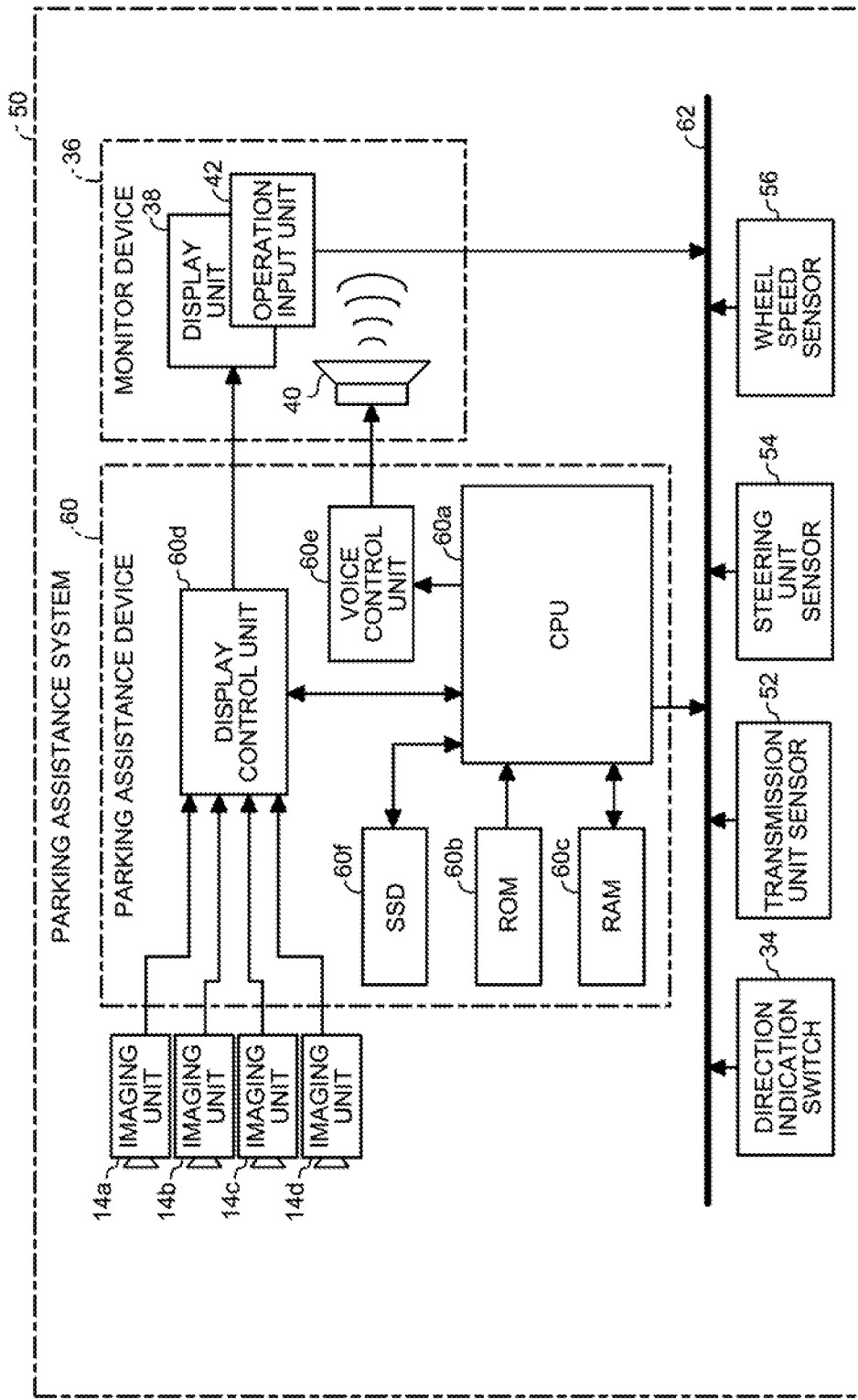
FIG. 3 is an exemplary block diagram illustrating an overall configuration of a parking assistance system including the parking assistance device according to the first and second embodiments.

FIG. 3 is an exemplary block diagram illustrating the overall configuration of a parking assistance system 50 including a parking assistance device 60 according to the embodiment. The parking assistance system 50 is mounted on the towing vehicle 10, and sets, as a target parking position, a position where the towing vehicle 10 can park according to an object around the towing vehicle 10, and generates an overhead image indicating around the towing vehicle 10 and displays the generated overhead image on the display unit 38.

As illustrated in FIG. 3, the parking assistance system 50 includes a plurality of imaging units 14a, 14b, 14c, and 14d, a direction indication switch 34, a transmission unit sensor 52, a steering unit sensor 54, a wheel speed sensor 56, a monitor device 36, a parking assistance device 60, and an in-vehicle network 62.

The plurality of imaging units 14 output captured images obtained by capturing an image around the towing vehicle 10 to the parking assistance device 60.

The direction indication switch 34 outputs a direction of a direction indication operated by a driver to the in-vehicle network 62.

The steering unit sensor 54 is, for example, an angle sensor including a hall element or the like, and when the steering unit 30 is a steering wheel or the like, detects a rotation angle of the steering wheel or the like as a steering angle of the steering unit 30. The steering unit sensor 54 outputs information on the detected steering angle of the steering unit 30 to the in-vehicle network 62.

The transmission unit sensor 52 is, for example, a position sensor, and when the transmission unit 32 is a shift lever, detects a position of the shift lever as a position of the transmission unit 32. The transmission unit sensor 52 outputs the detected position of the transmission unit 32 to the in-vehicle network 62.

The wheel speed sensor 56 is a sensor that has, for example, a hall element provided near the wheel 13 of the towing vehicle 10, and detects, as wheel speed information, a pulse number indicating a rotation amount of the wheel 13, the number of rotations of the wheel 13 per unit time, or the like. The wheel speed sensor 56 outputs wheel speed information as a value for calculating a vehicle speed or the like to the in-vehicle network 62.

The parking assistance device 60 is a computer including a microcomputer such as an electronic control unit (ECU). The parking assistance device 60 acquires the captured image data from the imaging unit 14. The parking assistance device 60 transmits to the monitor device 36 data related to an image or a voice generated based on the captured image or the like. The parking assistance device 60 transmits to the monitor device 36 data related to an image or a voice such as an instruction to a passenger and a notification to the passenger. The parking assistance device 60 receives the instruction from the passenger from the monitor device 36 via the in-vehicle network 62. The parking assistance device 60 sets the target parking position and displays a plurality of modes, a traveling direction of the towing vehicle 10, and a display image including an overhead image for display and a peripheral image according to the selected target parking position and the like on the display unit 38, thereby assisting the parking of the driver. The parking assistance device 60 includes a central processing unit (CPU) 60a, a read only memory (ROM) 60b, a random access memory (RAM) 60c, a display control unit 60d, a voice control unit 60e, and a solid state drive (SSD) 60f. The CPU 60a, the ROM 60b, and the RAM 60c may be integrated in the same package.

The CPU 60a is an example of a hardware processor, and reads a program stored in a nonvolatile storage device such as the ROM 60b and executes various arithmetic processes and controls according to the program. The CPU 60a executes, for example, parking assistance processing of the towing vehicle 10.

The ROM 60b stores each program, parameters necessary for executing the program, and the like. The RAM 60c temporarily stores various data used in the calculation by the CPU 60a. The display control unit 60d mainly performs image processing of the captured image obtained from the imaging unit 14, data conversion of an image for display to be displayed on the display unit 38, and the like, among the arithmetic processing in the parking assistance device 60, and outputs the image information to the display unit 38. The voice control unit 60e mainly executes the processing of voice to be output to the voice output unit 40 among the arithmetic processing in the parking assistance device 60, and outputs voice data to the voice output unit 40. The SSD 60f is a rewritable nonvolatile storage device, and maintains data even when a power supply of the parking assistance device 60 is turned off.

The in-vehicle network 62 includes, for example, a controller area network (CAN), a local interconnect network (LIN), and the like. The in-vehicle network 62 connects the direction indication switch 34, the transmission unit sensor 52, the steering unit sensor 54, the wheel speed sensor 56, the operation input unit 42 of the monitor device 36, and the parking assistance device 60 to be able to transmit and receive information therebetween.

Figure 4:
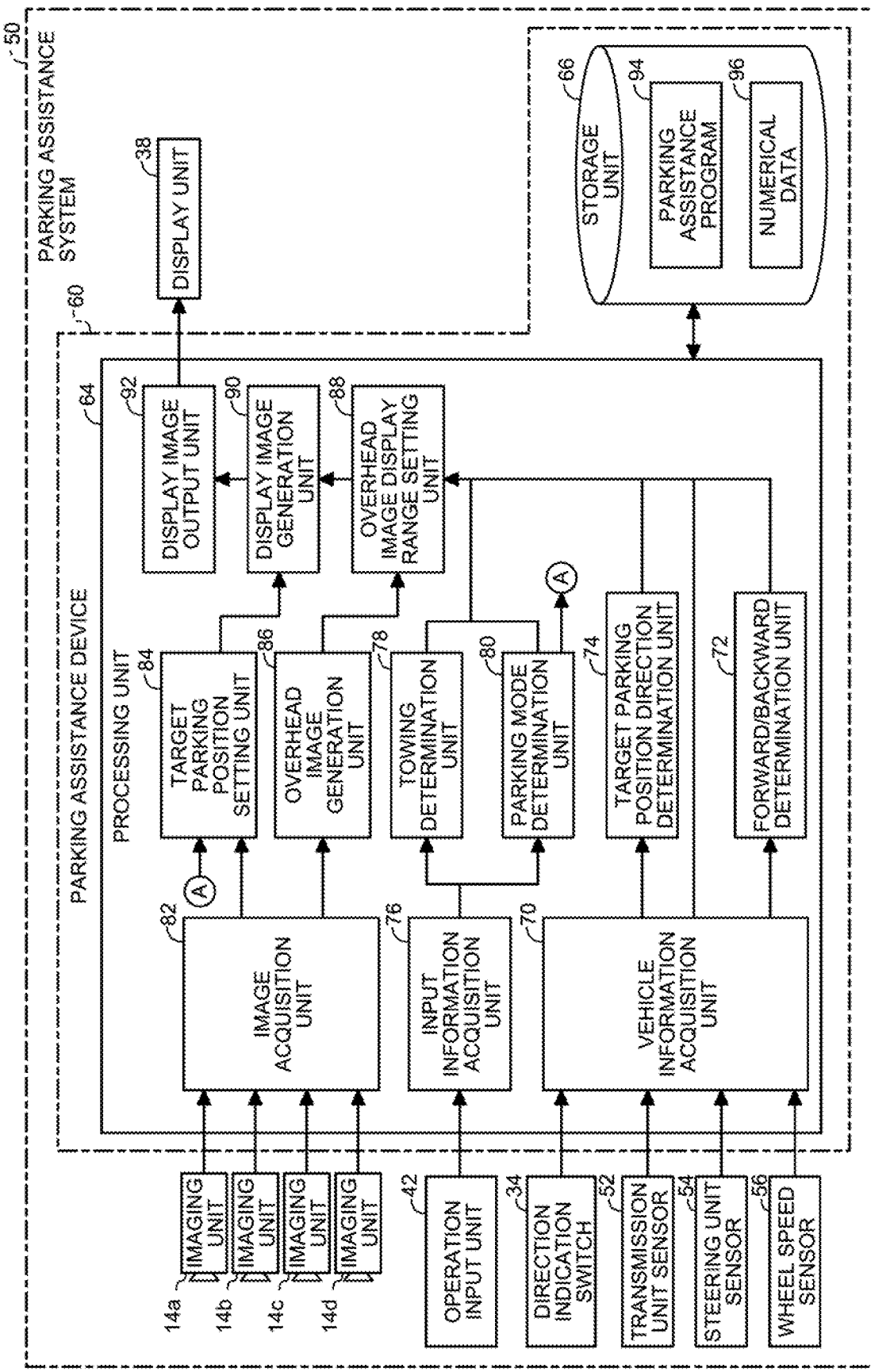
FIG. 4 is an exemplary block diagram for describing functions of the parking assistance device according to the first embodiment.

FIG. 4 is an exemplary block diagram for describing functions of the parking assistance device 60 according to the first embodiment. As illustrated in FIG. 4, the parking assistance device 60 includes a processing unit 64 and a storage unit 66.

The processing unit 64 is implemented as a function of the CPU 60a or the display control unit 60d. The processing unit 64 includes a vehicle information acquisition unit 70, a forward/backward determination unit 72, a target parking position direction determination unit 74, an input information acquisition unit 76, a towing determination unit 78, a parking mode determination unit 80, an image acquisition unit 82, a target parking position setting unit 84, an overhead image generation unit 86, an overhead image display range setting unit 88, a display image generation unit 90, and a display image output unit 92. The processing unit 64 reads a parking assistance program 94, which is software stored in the storage unit 66, and as a result, may implement the functions of the vehicle information acquisition unit 70, the forward/backward determination unit 72, the target parking position direction determination unit 74, the input information acquisition unit 76, the towing determination unit 78, the parking mode determination unit 80, the image acquisition unit 82, the target parking position setting unit 84, the overhead image generation unit 86, the overhead image display range setting unit 88, the display image generation unit 90, and the display image output unit 92. Some or all of the vehicle information acquisition unit 70, the forward/backward determination unit 72, the target parking position direction determination unit 74, the input information acquisition unit 76, the towing determination unit 78, the parking mode determination unit 80, the image acquisition unit 82, the target parking position setting unit 84, the overhead image generation unit 86, the overhead image display range setting unit 88, the display image generation unit 90, and the display image output unit 92 may be implemented by hardware such as an application specific integrated circuit (ASIC) or a field-programmable gate array (FPGA).

The vehicle information acquisition unit 70 acquires information on the towing vehicle 10.

Specifically, the vehicle information acquisition unit 70 acquires, from the direction indication switch 34, the direction information in which the driver operates the direction indication switch 34 to light up the direction indicator 16. The vehicle information acquisition unit 70 outputs the direction information of the direction indicator 16 to the target parking position direction determination unit 74. The vehicle information acquisition unit 70 acquires, from the transmission unit sensor 52, the position information for determining drive, reverse, and the like of the transmission unit 32. The vehicle information acquisition unit 70 outputs the position information of the transmission unit 32 to the forward/backward determination unit 72. The vehicle information acquisition unit 70 acquires the steering angle information of the steering unit 30 from the steering unit sensor 54, and acquires the wheel speed information indicating the rotation speed and the like of the wheel 13 from the wheel speed sensor 56. The vehicle information acquisition unit 70 outputs the steering angle information of the steering unit 30 and the wheel speed information of the wheel 13 to the overhead image display range setting unit 88.

The forward/backward determination unit 72 determines the traveling direction of the towing vehicle 10 in the front-rear direction based on the position information of the transmission unit 32 acquired from the vehicle information acquisition unit 70. Specifically, the forward/backward determination unit 72 determines that the traveling direction of the towing vehicle 10 moves backward when the position of the transmission unit 32 is reverse, and determines that the traveling direction of the towing vehicle 10 moves forward in the case of driving or the like other than the reverse. The forward/backward determination unit 72 outputs the determination result of the traveling direction of the towing vehicle 10 to the overhead image display range setting unit 88.

The target parking position direction determination unit 74 determines the direction of the target parking position selected by the passenger in the left-right direction based on the direction information of the direction indicator 16 acquired from the vehicle information acquisition unit 70. For example, the target parking position direction determination unit 74 may determine the direction indicated by the direction indicator 16 as the direction of the target parking position in the left-right direction. The target parking position direction determination unit 74 outputs the determination result in the left-right direction of the target parking position selected by the passenger to the overhead image display range setting unit 88.

The input information acquisition unit 76 acquires the instruction input to the operation input unit 42 by the passenger from the operation input unit 42. The input information acquisition unit 76 acquires, from the operation input unit 42, a setting instruction related to a normal mode or a towing mode, a setting instruction of a parking mode, a selection instruction of the target parking position, and the like. The input information acquisition unit 76 outputs the setting instruction related to the normal mode or the towing mode to the towing determination unit 78. The input information acquisition unit 76 outputs a setting instruction of a parking mode to the parking mode determination unit 80. The input information acquisition unit 76 outputs the selection instruction of the target parking position to the parking mode determination unit 80.

The towing determination unit 78 determines whether the towing vehicle 10 tows the towed vehicle 20. For example, the towing determination unit 78 determines whether the mode set by the passenger is the normal mode or the towing mode based on the setting instruction related to the normal mode or the towing mode acquired from the input information acquisition unit 76. The normal mode is a mode set when the towing vehicle 10 does not tow the towed vehicle 20. Therefore, when the normal mode is set, the towing determination unit 78 determines that the towing vehicle 10 does not tow the towed vehicle 20. The normal mode is a mode set when the towing vehicle 10 does not tow the towed vehicle 20. Therefore, when the normal mode is set, the towing determination unit 78 determines that the towing vehicle 10 tows the towed vehicle 20. The towing determination unit 78 outputs to the overhead image display range setting unit 88 the information of the determined mode or the information of whether the towed vehicle is towed.

The parking mode determination unit 80 determines whether the setting instruction of the parking mode setting instruction acquired from the input information acquisition unit 76 has acquired. The parking mode is a mode for setting the target parking position and assisting parking. Note that in the present embodiment, even if the parking mode is selected when the towing vehicle 10 moves backward, the mode is not switched until the towing vehicle 10 is switched to forward movement. When it is determined that the parking mode setting instruction is received, the parking mode determination unit 80 outputs, to the overhead image display range setting unit 88 and the target parking position setting unit 84, the determination result indicating that the parking mode is set. Further, the parking mode determination unit 80 determines whether the passenger selects the target parking position set by the target parking position setting unit 84. When the passenger selects the target parking position, the parking mode determination unit 80 outputs the selection to the overhead image display range setting unit 88.

The image acquisition unit 82 acquires a captured image obtained by capturing an image around the towing vehicle 10 from each imaging unit 14. The image acquisition unit 82 outputs the acquired captured image to the target parking position setting unit 84 and the overhead image generation unit 86.

When the determination result that the parking mode is set from the parking mode determination unit 80 is acquired, the target parking position setting unit 84 sets the target parking position based on a plurality of captured images around the towing vehicle 10 acquired from the image acquisition unit 82. Specifically, the target parking position setting unit 84 detects an object such as an obstacle around the towing vehicle 10 and the towed vehicle 20 from the captured image, and detects a position where the towing vehicle 10 and the towed vehicle 20 can be parked based on the position of the object, thereby setting the target parking position. The target parking position setting unit 84 outputs the target parking position to the display image generation unit 90.

The overhead image generation unit 86 acquires a plurality of captured images around the towing vehicle 10 captured by each imaging unit 14 from the image acquisition unit 82, and generates the overhead image from the captured images. Specifically, the overhead image generation unit 86 converts viewpoints of the plurality of captured images into an image viewed from a virtual viewpoint converted into an upper side of the towing vehicle 10, and connects the converted images. Thereby, the overhead image generation unit 86 generates the overhead image that overlooks around the towing vehicle 10 from the virtual viewpoint converted into the upper side of the towing vehicle 10. In addition, the overhead image generation unit 86 generates the overhead image including the wider area of the real world than the area of the real world included in the overhead image for display in order for the display image generation unit 90 to be described later to trim the overhead image for display included in the display image from the overhead image. The overhead image generation unit 86 outputs the generated overhead image to the overhead image display range setting unit 88.

The overhead image display range setting unit 88 selects and sets a trimming range from two display ranges including a first display range and a second display range wider than the first display range. The first display range and the second display range may be set in accordance with the area assigned to the overhead image for display in the display image, and may be, for example, a quadrangular shape. The second display range is wider than the first display range in the front-rear direction range and the left-right direction range of the towing vehicle 10. The trimming range is a range to be cut from the overhead image generated from the captured image in order to generate the overhead image for display included in the display image. The overhead image display range setting unit 88 may set the trimming range from the first display range and the second display range based on information acquired from the towing determination unit 78, the parking mode determination unit 80, the target parking position direction determination unit 74, and the forward/backward determination unit 72.

For example, the overhead image display range setting unit 88 selects the trimming range from the first display range or the second display range based on the determination result as to whether the towed vehicle 20 acquired from the towing determination unit 78 is towed. Specifically, when the normal mode is set and the towing determination unit 78 determines that the towing vehicle 10 does not tow the towed vehicle 20, the overhead image display range setting unit 88 selects the first display range. On the other hand, when the normal mode is set and the towing determination unit 78 determines that the towing vehicle 10 tows the towed vehicle 20, the overhead image display range setting unit 88 selects the second display range.

The overhead image display range setting unit 88 sets the position of the trimming range in the front-rear direction within the overhead image. For example, the overhead image display range setting unit 88 may select the center of the trimming range in the front-rear direction within the overhead image from any one of preset first front-rear position, second front-rear position, and third front-rear position to set the position of the trimming range. The first front-rear position is behind the center of the overhead image. The second front-rear position is ahead of the center of the overhead image, and ahead of the first front-rear position. The third front-rear position may be ahead of the first front-rear position, behind the second front-rear position, and the middle (for example, center) of the overhead image.

Specifically, before the parking mode is set, when it is determined that the towed vehicle 20 is towed and the second display range is selected, the overhead image display range setting unit 88 sets the center of the trimming range to be the first front-rear position even in either case where the towing vehicle 10 moves forward and backward. When the normal mode is set and the first display range is selected, the overhead image display range setting unit 88 sets the center of the trimming range to be the third front-rear position.

When it is determined that the towed vehicle 20 is towed so that the second display range is selected, and the parking mode is set, the overhead image display range setting unit 88 may set a position of the center of the trimming range in the front-rear direction within the overhead image according to the traveling direction of the towing vehicle 10 in the front-rear direction. The overhead image display range setting unit 88 may determine the traveling direction of the towing vehicle 10 in the front-rear direction based on the determination result determined by the forward/backward determination unit 72. When it is determined that the towed vehicle 20 is towed so that the second display range is selected, the parking mode is set, and the towing vehicle 10 moves forward, the overhead image display range setting unit 88 sets the center of the trimming range to be the second front-rear position. In the present embodiment, the parking mode is not set during the backward movement of the towing vehicle 10, and as a result, the parking mode and the center of the trimming range at the time of the backward movement need not be set.

The overhead image display range setting unit 88 sets the position of the center of the trimming range in the left-right direction within the overhead image. For example, the overhead image display range setting unit 88 may select and set the center of the trimming range in the left-right direction within the overhead image from any one of the preset first left-right position, second left-right position, and third left-right position. The first left-right position is the right with respect to the center within the overhead image. The second left-right position is the left with respect to the center within the overhead image. The third left-right position is the middle (for example, center) within the overhead image. The overhead image display range setting unit 88 sets the center of the trimming range to be the third left-right position until the target parking position is selected and fixed by the passenger.

The overhead image display range setting unit 88 selects the third left-right position as the left-right position of the trimming range until the target parking position is set. When it is determined that the towed vehicle 20 is towed so that the second display range is selected, and the target parking position is selected by the passenger in the parking mode, the overhead image display range setting unit 88 may set the trimming range to be a target position side selected within the overhead image, in the left-right direction. For example, when the target parking position direction determination unit 74 determines that the right target parking position is selected by the passenger, the overhead image display range setting unit 88 selects the first left-right position. When the target parking position direction determination unit 74 determines that the left target parking position is selected by the passenger, the overhead image display range setting unit 88 selects the second left-right position.

The overhead image display range setting unit 88 outputs, to the display image generation unit 90, any one of the first display range and the second display range set as the trimming range, the front, rear, left, and right positions of the trimming range, the traveling direction of the towing vehicle 10 in the front-rear direction, and the target parking position, together with the captured image and the overhead image. The position of the center of the trimming range specified by the front, rear, left, and right positions of the trimming range is described as a trimming position.

The display image generation unit 90 generates the overhead image for display by trimming the trimming range of the overhead image, and generates the display image including the overhead image for display on which the image of the towing vehicle 10 is superimposed. For example, the display image generation unit 90 generates the overhead image for display based on the overhead image, the trimming range, and the trimming position that are acquired from the overhead image display range setting unit 88. Specifically, the display image generation unit 90 arranges the trimming range at the trimming position in the overhead image, and trims the overhead image in the trimming range, thereby generating the overhead image for display. Furthermore, the display image generation unit 90 may superimpose the image of the towing vehicle 10 in the case of the normal mode on the trimmed overhead image for display, and superimpose the images of the towing vehicle 10 and the towed vehicle 20 in the case of the towing mode. The display image generation unit 90 may superimpose the image of the target parking position on the overhead image for display based on the target parking position obtained from the overhead image display range setting unit 88 when the parking mode is set.

In addition, the display image generation unit 90 may select one captured image from a plurality of captured images based on the traveling direction of the towing vehicle 10 in the front-rear direction, and generate a peripheral image from the captured image without performing the viewpoint conversion. Note that the display image generation unit 90 may generate the peripheral image without performing image processing on the captured image and generate the peripheral image by performing image processing such as distortion removal on the captured image. For example, when the towing vehicle 10 moves forward, the display image generation unit 90 selects a captured image of a front periphery captured by the imaging unit 14a as a peripheral image. On the other hand, when the towing vehicle 10 moves backward, the display image generation unit 90 selects a captured image of a rear periphery captured by the imaging unit 14b as a peripheral image. The display image generation unit 90 may generate a peripheral image for display by superimposing a course line or the like on the peripheral image. Furthermore, in the case of the towing mode, the display image generation unit 90 may superimpose the image of the towed vehicle 20 on the peripheral image.

The display image generation unit 90 may generate a display image including the overhead image for display and the peripheral image. For example, the display image generation unit 90 may generate a display image in which the overhead image for display is arranged on the left and the peripheral image is arranged on the right. The display image generation unit 90 outputs the display image to the display image output unit 92.

The display image output unit 92 outputs the display image acquired from the display image generation unit 90 to the display unit 38 and displays the display image.

The storage unit 66 is implemented as functions such as the ROM 60b, the RAM 60c, and the SSD 60f. The storage unit 66 stores a program executed by the processing unit 64, data necessary for executing the program, and data generated by executing the program. The storage unit 66 may be implemented as a function of a storage device provided outside. For example, the storage unit 66 stores a parking assistance program 94 executed by the processing unit 64. The storage unit 66 stores numerical data 96 necessary for executing the parking assistance program 94. The numerical data 96 includes, for example, information on the first display range and the second display range including a lengthwise/crosswise length of the trimming range, coordinates of the trimming position in the front-rear direction and the left-right direction in the overhead image, and the like. The storage unit 66 temporarily stores the sizes, the positions, and the like of the peripheral image, the overhead image, the display image, and the trimming range that are generated by executing the parking assistance program 94.

Figure 5:
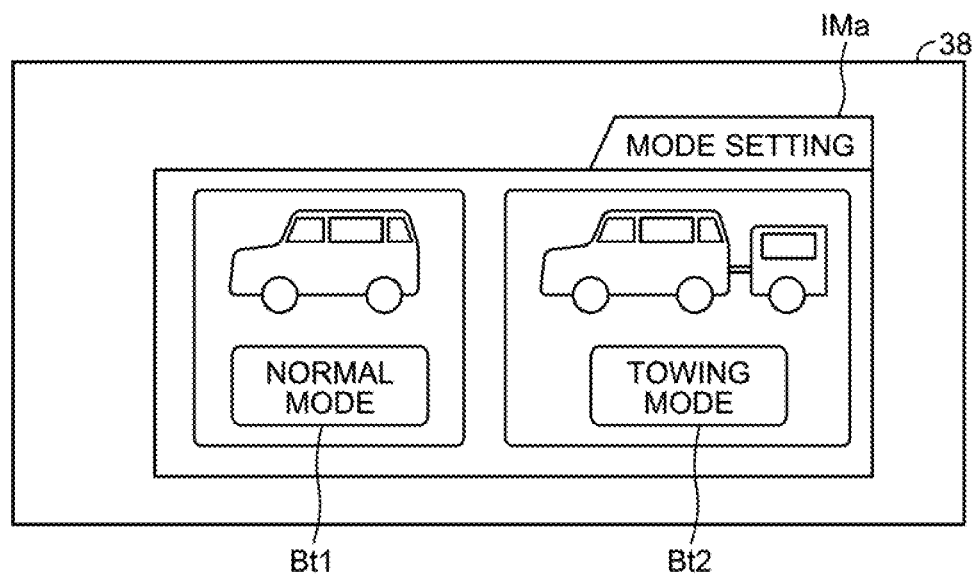
FIG. 5 is a schematic diagram illustrating an example of a mode setting image for selecting a normal mode and a towing mode in the parking assistance device according to the first embodiment.

FIG. 5 is a diagram illustrating an example of a mode setting image IMa for selecting a normal mode and a towing mode. As illustrated in FIG. 5, the towing determination unit 78 displays the mode setting image IMa including a normal mode button Bt1 and a towing mode button Bt2 on the display unit 38, and receives the mode selected by the passenger. Specifically, when the towing determination unit 78 acquires from the input information acquisition unit 76 that the passenger touches the normal mode button Bt1, the towing determination unit 78 determines that the normal mode is selected, and when the towing determination unit 78 acquires from the input information acquisition unit 76 that the towing mode button Bt2 is touched, the towing determination unit 78 determines that the towing mode is selected.

Figure 6:
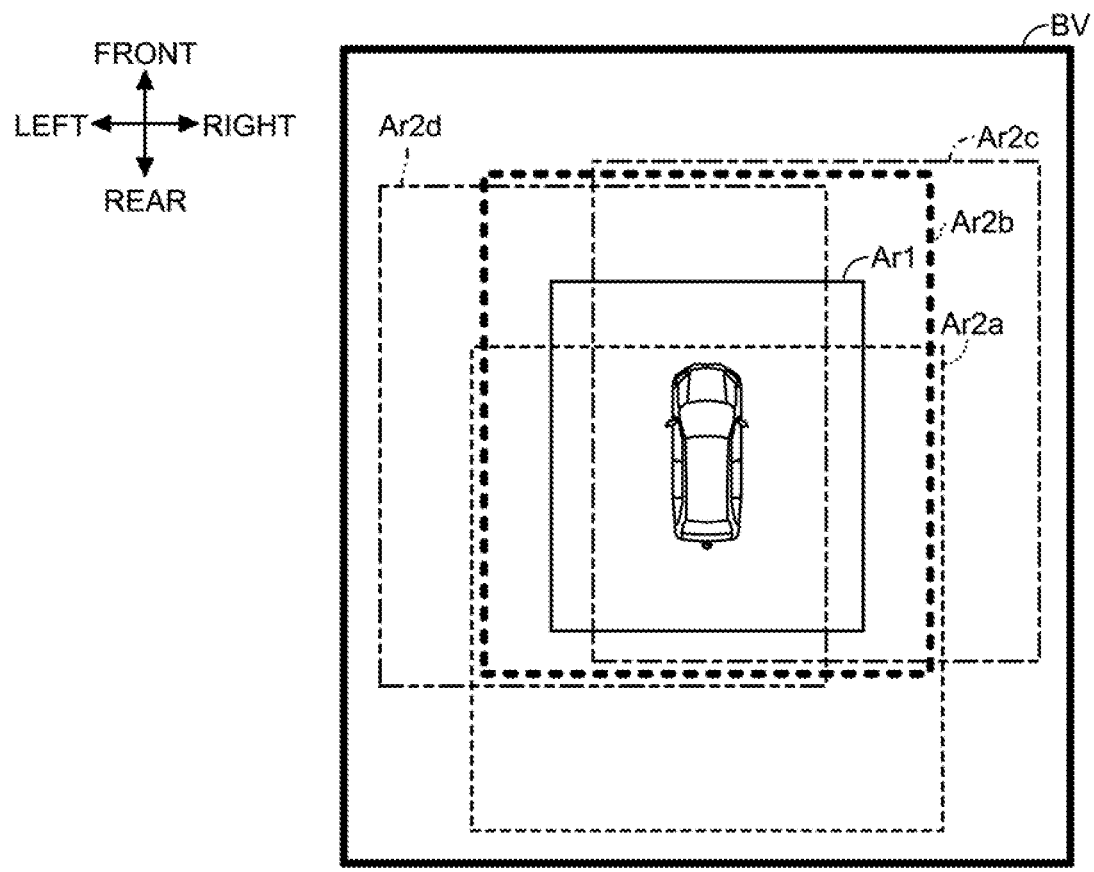
FIG. 6 is a plan view for describing sizes and positions of an overhead image and a trimming range in the parking assistance device according to the first embodiment.
Figure 7:
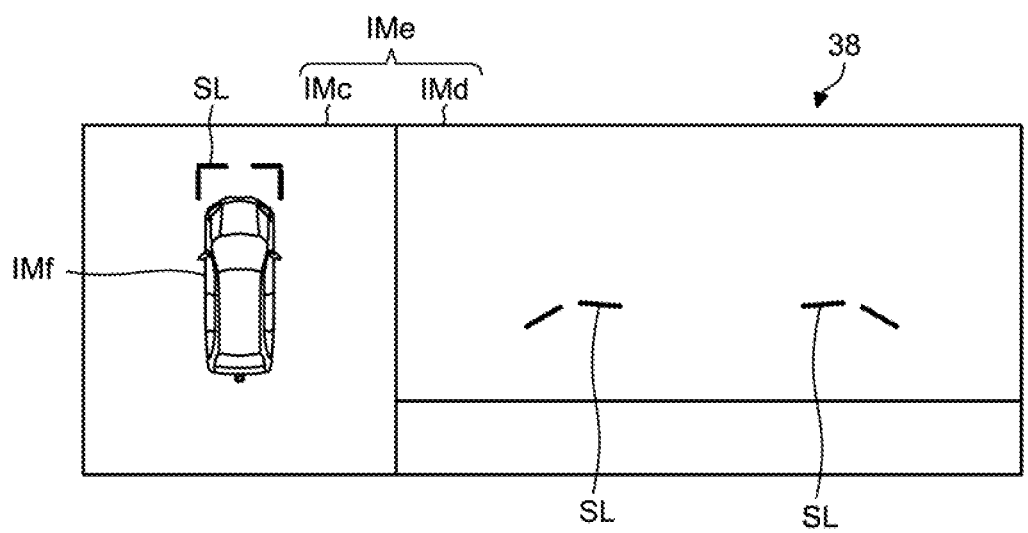
FIG. 7 is a schematic diagram illustrating an example of a display image in a case where it is determined that the towed vehicle is not towed and the towing vehicle moves forward, in the parking assistance device according to the first embodiment.
Figure 8:
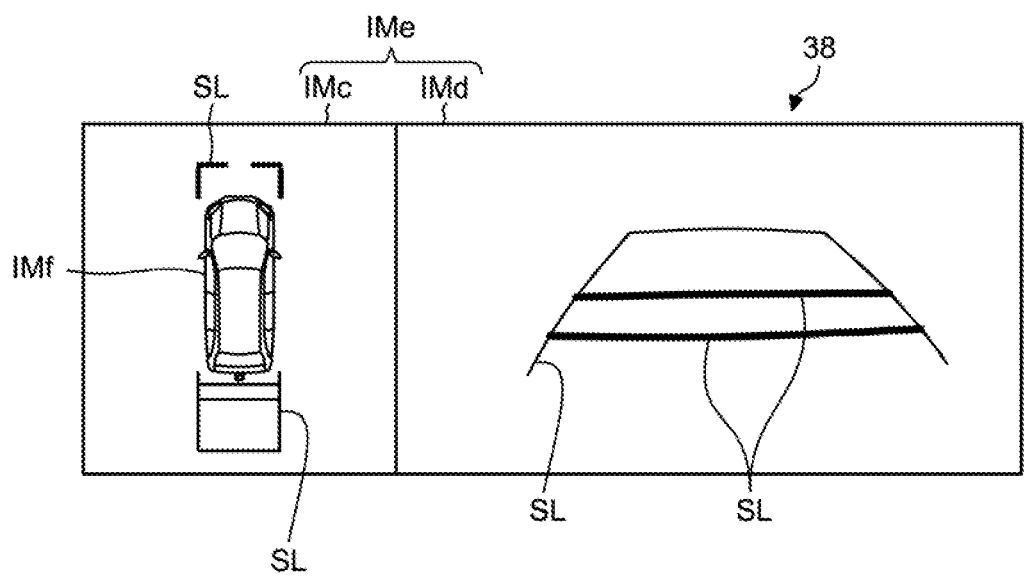
FIG. 8 is a schematic diagram illustrating an example of a display image in a case where it is determined that the towed vehicle is not towed and the towing vehicle moves backward, in the parking assistance device according to the first embodiment.
Figure 9:
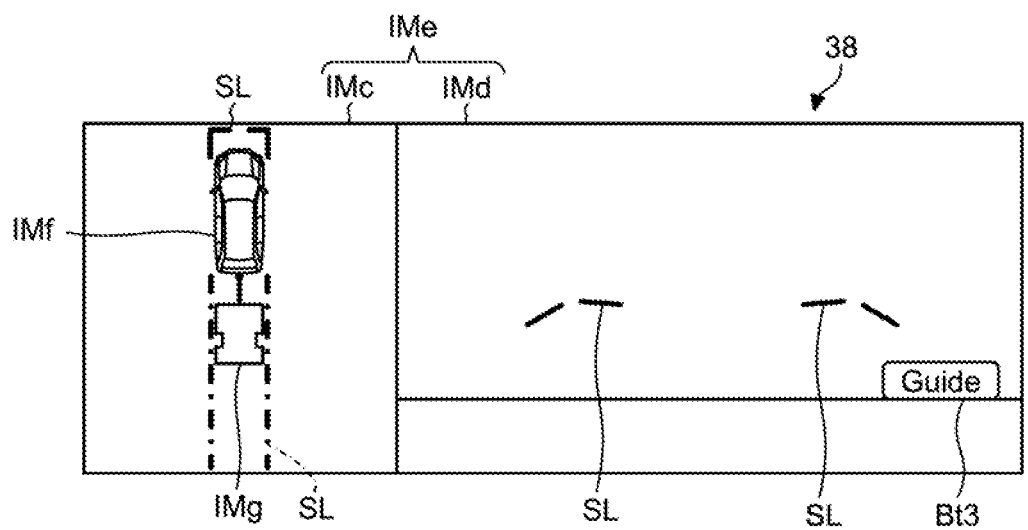
FIG. 9 is a schematic diagram illustrating an example of a display image in a case where it is determined that the towed vehicle is towed and the towing vehicle moves forward, in the parking assistance device according to the first embodiment.
Figure 10:
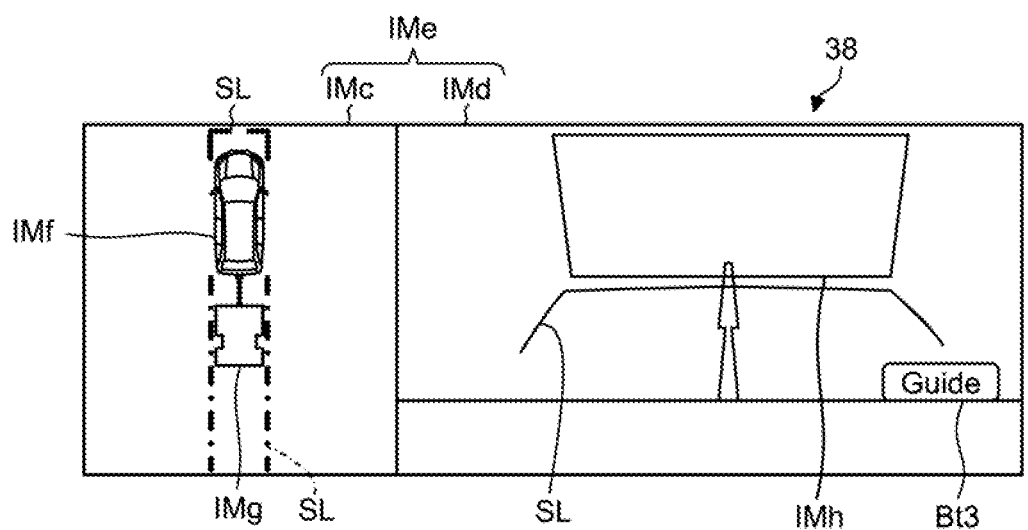
FIG. 10 is a schematic diagram illustrating an example of a display image in a case where it is determined that the towed vehicle is towed and the towing vehicle moves backward, in the parking assistance device according to the first embodiment.
Figure 11:
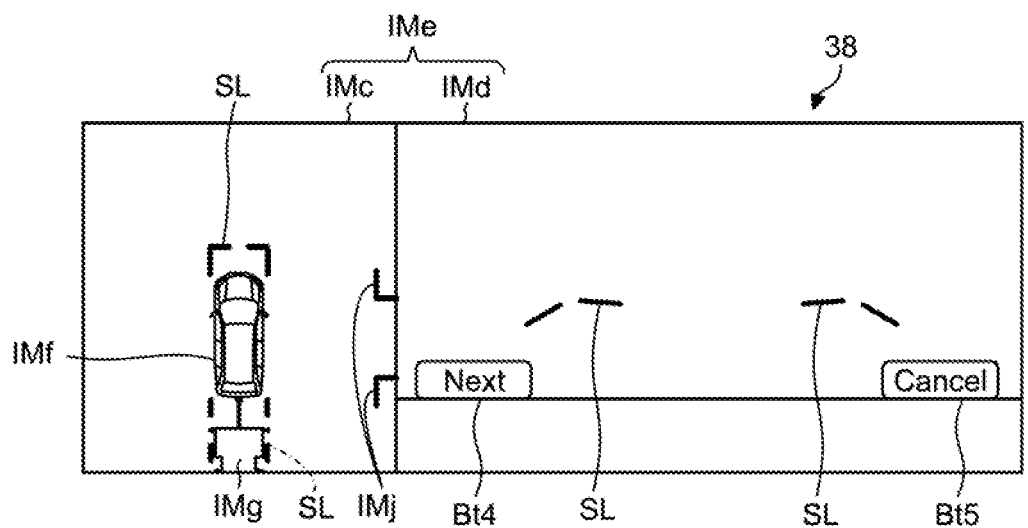
FIG. 11 is a schematic diagram illustrating an example of a display image in a case where it is determined that the towed vehicle is towed, a parking mode is set, and the towing vehicle moves forward, in the parking assistance device according to the first embodiment.
Figure 12:
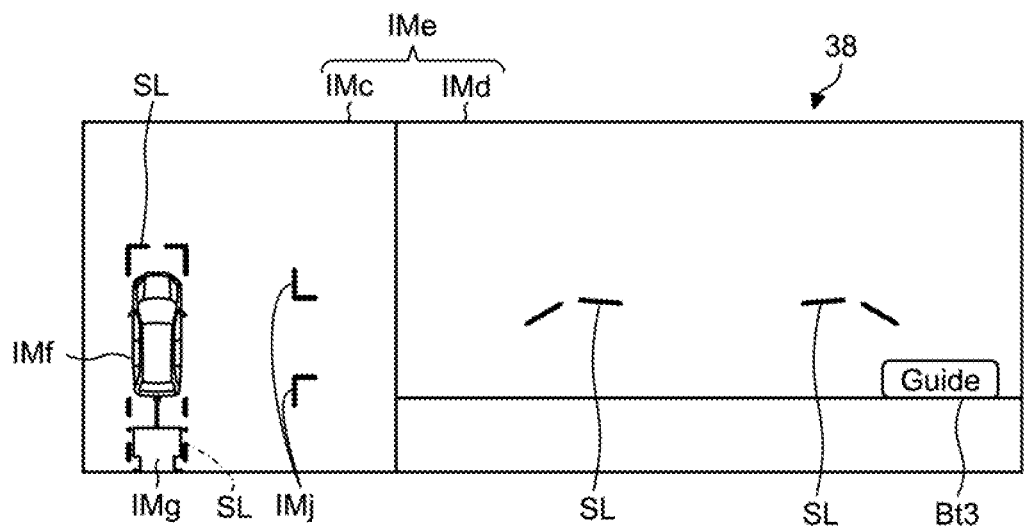
FIG. 12 is a schematic diagram illustrating an example of a display image in a case where it is determined that the towed vehicle is towed, the parking mode is set, and a right target parking position is selected, in the parking assistance device according to the first embodiment.
Figure 13:
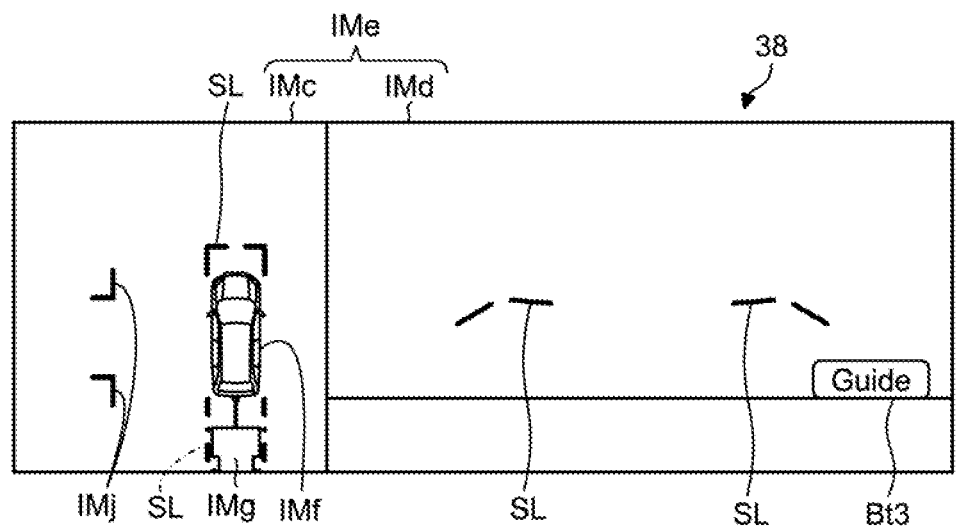
FIG. 13 is a schematic diagram illustrating an example of a display image in a case where it is determined that the towed vehicle is towed, the parking mode is set, and a left target parking position is selected, in the parking assistance device according to the first embodiment.
Figure 14:
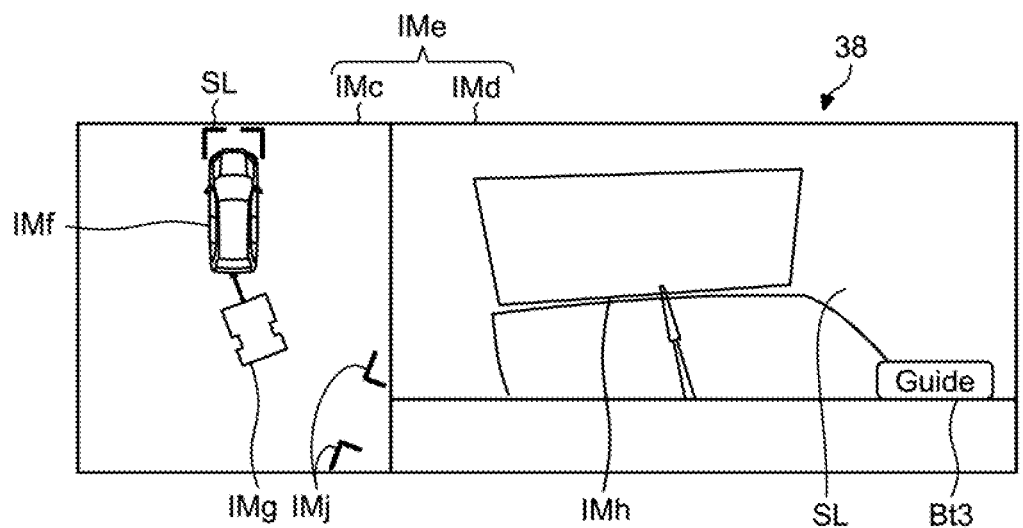
FIG. 14 is a schematic diagram illustrating an example of a display image in a case where it is determined that the towed vehicle is towed, the parking mode is set, the right target parking position is selected, and the towing vehicle moves backward while turning, in the parking assistance device according to the first embodiment.

FIG. 6 is an exemplary plan view for describing sizes and positions of an overhead image BV and a trimming range. FIG. 7 is a diagram illustrating an example of the display image IMe when it is determined that the towed vehicle 20 is not towed and the towing vehicle 10 moves forward. FIG. 8 is a diagram illustrating an example of the display image IMe when it is determined that the towed vehicle 20 is not towed and the towing vehicle 10 moves backward. FIG. 9 is a diagram illustrating an example of the display image IMe when it is determined that the towed vehicle 20 is towed and the towing vehicle 10 moves forward. FIG. 10 is a diagram illustrating an example of the display image IMe when it is determined that the towed vehicle 20 is towed and the towing vehicle 10 moves backward. FIG. 11 is a diagram illustrating an example of the display image IMe when it is determined that the towed vehicle 20 is towed, the parking mode is set, and the towing vehicle 10 moves forward. FIG. 12 is a diagram illustrating an example of the display image IMe when it is determined that the towed vehicle 20 is towed, the parking mode is set, and the right target parking position is selected. FIG. 13 is a diagram illustrating an example of the display image IMe when it is determined that the towed vehicle 20 is towed, the parking mode is set, and the left target parking position is selected. FIG. 14 is a diagram illustrating an example of the display image IMe when it is determined that the towed vehicle 20 is towed, the parking mode is set, the right target parking position is selected, and the towing vehicle 10 moves backward while turning.

The overhead image generation unit 86 acquires the captured images from each of the plurality (for example, four) of imaging units 14 via the image acquisition unit 82, and generates the overhead image BV indicated by a thick solid line in FIG. 6. An image 6 (hereinafter, host vehicle image IMf) of the towing vehicle 10 illustrated in FIG. 6 indicates the position of the towing vehicle 10 within the overhead image BV. The position of the towing vehicle 10 is, for example, a center of the overhead image BV. The overhead image display range setting unit 88 sets the size and position of the trimming range based on whether the towed vehicle 20 is towed, whether the parking mode is set, and the left-right direction position of the selected target parking position.

For example, when the normal mode is selected and the towing determination unit 78 determines that the towed vehicle 20 is not towed, the overhead image display range setting unit 88 selects a first display range Ar1 shown by a thin solid line in FIG. 6 and selects the third front-rear position and the third left-right position as the trimming position to arrange the first display range Ar1. In other words, the overhead image display range setting unit 88 sets the first display range Ar1 at a position of a center of the overhead image BV. The display image generation unit 90 generates the overhead image for display by trimming an area surrounded by the set first display range Ar1 of the overhead image BV. Thereby, as illustrated in FIGS. 7 and 8, the display image generation unit 90 generates the display image IMe that includes an overhead image for display IMc having a host vehicle image IMf superimposed at the middle. The display image generation unit 90 does not move the position of the vehicle image IMf within the overhead image for display IMc even when the towing vehicle 10 moves. Therefore, the display image generation unit 90 calculates a traveling route of the towing vehicle 10 based on the information on the steering angle acquired from the steering unit sensor 54 and the wheel speed information acquired from the wheel speed sensor 56 to change or move the overhead image for display IMc. The display image generation unit 90 may generate the display image IMe including a peripheral image IMd of the towing vehicle 10 in the traveling direction together with the overhead image for display IMc. For example, when the towing vehicle 10 moves forward, as illustrated in FIG. 7, the display image generation unit 90 may generate the display image IMe including the front peripheral image IMd captured by the imaging unit 14a. When the towing vehicle 10 moves backward, as illustrated in FIG. 8, the display image generation unit 90 may generate the display image IMe including the rear peripheral image IMd captured by the imaging unit 14b. In addition, the display image generation unit 90 may superimpose an assistance line SL for assisting traveling on the display image IMe. For example, when the towing vehicle 10 moves forward, the display image generation unit 90 may superimpose the assistance line SL indicating a trajectory traveling forward of the towing vehicle 10 and a distance (for example, 1 m) from the towing vehicle 10 on the overhead image for display IMc and the peripheral image IMd. When the towing vehicle 10 moves backward, the display image generation unit 90 may superimpose the assistance line SL indicating the trajectory traveling forward and backward of the towing vehicle 10 and the distance (for example, 50 cm, 1 m, and 2.5 m) from the towing vehicle 10.

When the towing determination unit 78 determines that the towed vehicle 20 is towed, the overhead image display range setting unit 88 selects any one of second display ranges Ar2a, Ar2b, Ar2c, and Ar2d illustrated in FIG. 6 as the trimming range. When it is not necessary to distinguish the second display ranges Ar2a, Ar2b, Ar2c, and Ar2d, the second display ranges Ar2a, Ar2b, Ar2c, and Ar2d are described as the second display range Ar2. Note that of the second display ranges Ar2a, Ar2b, Ar2c, and Ar2d, left and right widths are partially changed to avoid overlapping lines, but left and right widths of the second display ranges Ar2a, Ar2b, Ar2c, and Ar2d all are the same. Furthermore, the overhead image display range setting unit 88 sets the trimming position of the second display range Ar2 within the overhead image BV based on the traveling direction of the towing vehicle 10 in the front-rear direction, whether the parking mode is set, and the position of the target parking position in the left-right direction selected by passenger in the parking mode.

The display image generation unit 90 generates the overhead image for display IMc by trimming the overhead image BV based on the positions of the second display range Ar2 and the second display range Ar2 set by the overhead image display range setting unit 88, and generates the display image IMe including the overhead image for display IMc and the peripheral image IMd. Here, the second display range Ar2 is larger than the first display range Ar1, and a size of a display area of the overhead image for display IMc within the display image IMe is the same even in both the second display range Ar2 and the first display range Ar1. Therefore, the display image generation unit 90 more zooms-out the overhead image for display IMc in the second display range Ar2 than the overhead image for display IMc in the first display range Ar1, or more zooms-in the overhead image for display IMc in the first display range Ar1 than the overhead image for display IMc in the second display range Ar2.

When the towing determination unit 78 determines that the towed vehicle 20 is towed before the parking mode is set, the overhead image display range setting unit 88 selects the first front-rear position and the third left-right position as the trimming position as in the second display area Ar2a illustrated in FIG. 6. Here, the first front-rear position is behind the center of the overhead image BV, and the second front-rear position and the third front-rear position. In this case, as illustrated in FIGS. 9 and 10, the display image generation unit 90 generates the overhead image for display IMc in which the host vehicle image IMf is arranged ahead of the center by trimming the overhead image BV of the second display range Ar2a. The display image generation unit 90 may superimpose the image (hereinafter, the towed image IMg) of the towed vehicle 20 on the overhead image for display IMc.

In addition, when the towing vehicle 10 moves forward even when the towing determination unit 78 determines that the towed vehicle 20 is towed, as illustrated in FIG. 9, the display image generation unit 90 may generate the display image IMe including the front peripheral image IMd captured by the imaging unit 14a. When the towing vehicle 10 moves backward, as illustrated in FIG. 10, the display image generation unit 90 may generate the display image IMe including the rear peripheral image IMd captured by the imaging unit 14*b* and a real towed image IMh obtained by actually capturing the towed vehicle 20. The display image generation unit 90 may superimpose the assistance line SL for assisting traveling on the display image IMe. Furthermore, the display image generation unit 90 may include a guide button Bt3 for receiving the parking mode in the display image IMe.

When it is determined that the towed vehicle 20 is towed, the passenger operates the guide button Bt3 to set the parking mode, and the towing vehicle 10 moves forward, the overhead image display range setting unit 88 selects the second front-rear position and the third left-right position as the trimming position as in the second display area Ar2*b* illustrated in FIG. 6. Here, the second front-rear position is ahead of the center of the overhead image BV, and the second front-rear position and the third front-rear position. In this case, as illustrated in FIG. 11, the display image generation unit 90 generates the overhead image for display IMc in which the center of the host vehicle image IMf is arranged in the second half and a front end of the host vehicle image IMf is arranged around the center by trimming the overhead image BV of the second display range Ar2*b*.

In addition, when it is determined that the towed vehicle 20 is towed, the parking mode is set, and the towing vehicle 10 moves forward, as illustrated in FIG. 11, the display image generation unit 90 may generate the display image IMe including the front peripheral image IMd captured by the imaging unit 14*a*. The display image generation unit 90 may superimpose the assistance line SL for assisting traveling on the display image IMe. Here, when the display image generation unit 90 acquires the position information of the target parking position detected by the target parking position setting unit 84 in the state in which the parking mode is set, the display image generation unit 90 may superimpose the image (hereinafter, target position image IMj) of the target parking position on the overhead image for display IMc. Furthermore, the display image generation unit 90 may include a cancel button Bt5 for canceling the parking mode and a next button Bt4 for determining the target parking position in the display image IMe.

When it is determined that the towed vehicle 20 is towed, the parking mode is set, the target parking position is selected by the passenger, and the towing vehicle moves forward, the overhead image display range setting unit 88 selects the second front-rear position and either the first left-right position or the second left-right position corresponding to the target parking position as the trimming position as in the second display ranges Ar2*c* and Ar2*d* illustrated in FIG. 6. For example, when the target parking position direction determination unit 74 determines that the selected target parking position is on the right, the overhead image display range setting unit 88 selects the second front-rear position and the first left-right position as the trimming position. Note that the first left-right position is the right with respect to the center within the overhead image BV. In this case, as illustrated in FIG. 12, the display image generation unit 90 trims the overhead image BV within the second display range Ar2*c* arranged on the target parking position side (that is, right) within the overhead image BV. Thereby, the display image generation unit 90 generates the overhead image for display IMc in which the host vehicle image IMf is arranged on the left with respect to the center and the target position image IMj approaches the center side before the target parking position is set. Also in this case, as illustrated in FIG. 12, the display image generation unit 90 may generate the display image IMe including the front (that is, traveling direction side) peripheral image IMd captured by the imaging unit 14*a*. The display image generation unit 90 may change the color (for example, gray to blue) and the like of the target position image IMj before and after the selection of the target parking position. The display image generation unit 90 may superimpose the assistance line SL for assisting traveling on the display image IMe. Here, when the target parking position is set, the display image generation unit 90 may erase the cancel button Bt5 and redisplay the guide button Bt3 for resetting the target parking position.

For example, when the target parking position direction determination unit 74 determines that the selected target parking position is on the left, the overhead image display range setting unit 88 selects the second front-rear position and the second left-right position as the trimming position. Note that the second left-right position is the left with respect to the center within the overhead image BV. In this case, as illustrated in FIG. 13, the display image generation unit 90 trims the overhead image BV within the second display range Ar2*d* arranged on the target parking position side (that is, left) within the overhead image BV. Thereby, the display image generation unit 90 generates the overhead image for display IMc in which the host vehicle image IMf is arranged on the right with respect to the center and the target position image IMj approaches the center side before the target parking position is set. Also in this case, the display image generation unit 90 may display the front peripheral image IMd and the guide button Bt3 in the display image IMe.

FIG. 6 illustrates that the positions before and after the second display ranges Ar2*b*, Ar2*c*, and Ar2*d* are shifted to avoid overlapping of the lines, but the positions before and after the second display ranges Ar2*b*, Ar2*c*, and Ar2*d* are the same.

When it is determined that the towed vehicle 20 is towed, the parking mode is set, and the towing vehicle 10 moves backward, the overhead image display range setting unit 88 selects, as the trimming position, the first front-rear position and the third left-right position as the left-right position as in the second display area Ar2*a* illustrated in FIG. 6. In other words, when it is determined that the towed vehicle 20 is towed and the towing vehicle 10 moves backward, the overhead image display range setting unit 88 selects the position of the second display range Ar2*a* illustrated in FIG. 6 regardless of whether the parking mode and the target parking position are set. Therefore, when it is determined that the towed vehicle 20 is towed, the parking mode and the target parking position are set, and the towing vehicle 10 moves backward, as illustrated in FIG. 14, the display image generation unit 90 generates the overhead image for display IMc which includes the host vehicle image IMf is arranged ahead of the center and is superimposed with the target position image IMj.

Here, when it is determined that the towed vehicle 20 is towed, the parking mode and the target parking position are set, and the towing vehicle 10 moves backward while turning, as illustrated in FIG. 14, the display image generation unit 90 obliquely arranges the towed image IMg indicating the towed vehicle 20 with respect to the host vehicle image IMf. In other modes, when the towing vehicle 10 is turning, the display image generation unit 90 may obliquely arrange the towed image IMg with respect to the host vehicle image IMf in accordance with the turning. The display image generation unit 90 may generate the display image IMe including the rear peripheral image IMd captured by the imaging unit 14b together with the overhead image for display IMc.

Figure 15:
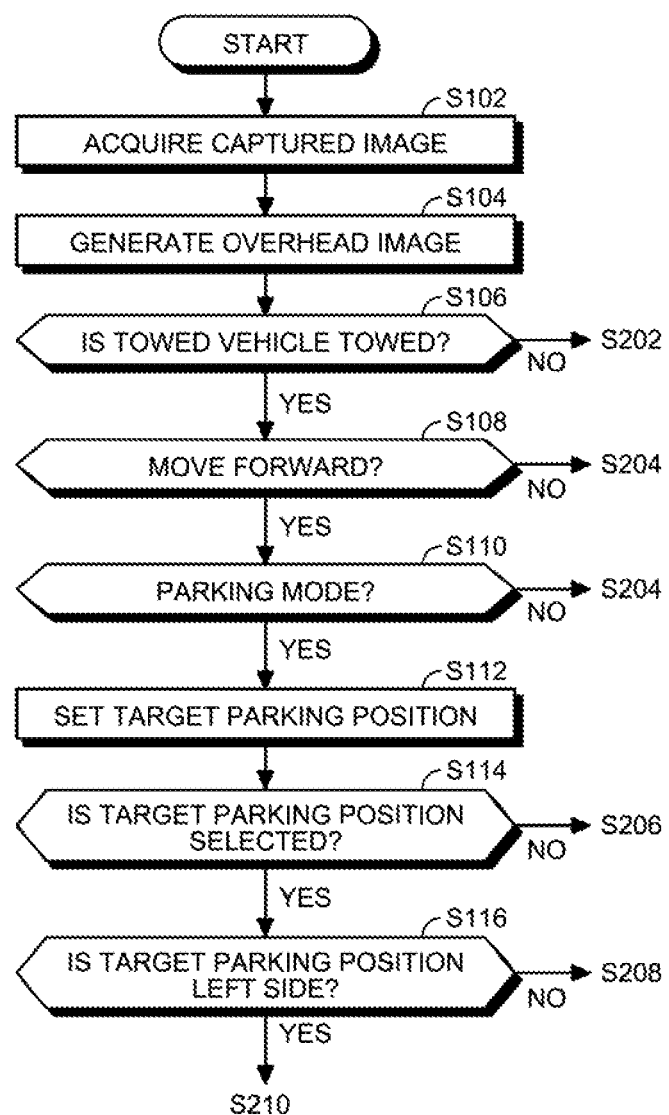
FIG. 15 is an exemplary flowchart of a first half of parking assistance processing executed by a processing unit in the parking assistance device according to the first embodiment.
Figure 16:
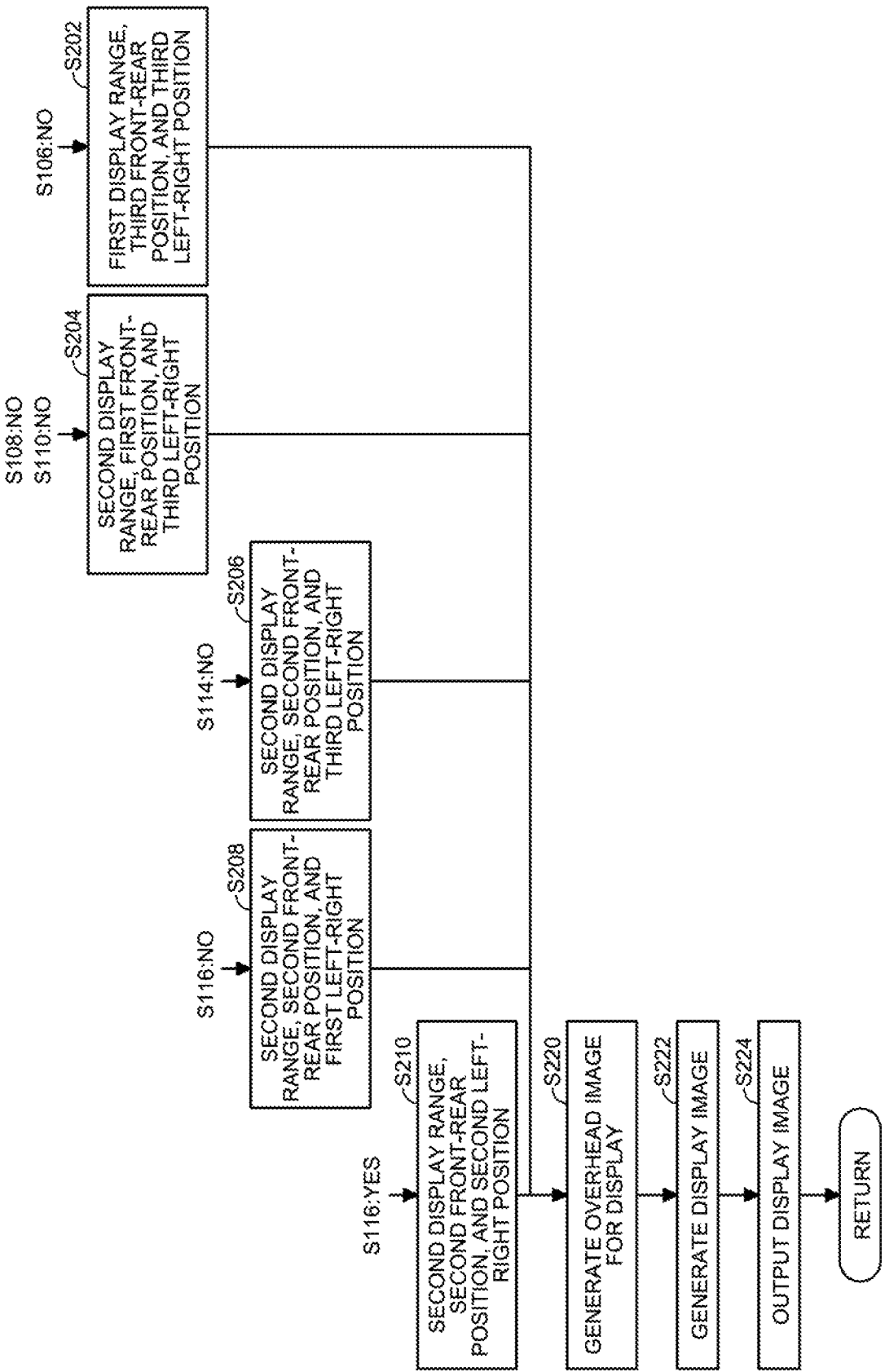
FIG. 16 is an exemplary flowchart of a second half of the parking assistance processing executed by the processing unit in the parking assistance device according to the first embodiment.

FIG. 15 is an exemplary flowchart of the first half of the parking assistance processing executed by the processing unit 64. FIG. 16 is an exemplary flowchart of the second half of the parking assistance processing executed by the processing unit 64. The processing unit 64 executes the parking assistance processing by reading the parking assistance program 94 stored in the storage unit 66.

As illustrated in FIG. 15, in the parking assistance processing, first, the image acquisition unit 82 acquires the captured image from each imaging unit 14, and outputs the captured image to the target parking position setting unit 84 and the overhead image generation unit 86 (S102). The overhead image generation unit 86 generates the overhead image BV having a wider range than the overhead image for display IMc in the real world based on the acquired captured image (S104).

Next, the towing determination unit 78 determines whether the towing vehicle 10 tows the towed vehicle 20 (S106). For example, the towing determination unit 78 may determine whether the towed vehicle 20 is towed based on whether the normal mode button Bt1 or the towing mode button Bt2 is selected by the passenger acquired via the input information acquisition unit 76. When the passenger touches and selects the normal mode button Bt1, the towing determination unit 78 determines that the towed vehicle 20 is not towed (S106: No), and outputs the fact to the overhead image display range setting unit 88. When neither of the buttons Bt1 and Bt2 is touched, the towing determination unit 78 may determine that the normal mode is selected and determine that the towed vehicle 20 is not towed. When the fact that the towed vehicle is not towed is acquired from the towing determination unit 78, the overhead image display range setting unit 88 selects the first display range Ar1 as the trimming range and selects the third front-rear position and the third left-right position as the trimming position, and outputs the selected first display range Ar1 and the third front-rear position and the third left-right position to the display image generation unit 90 (S202).

The display image generation unit 90 generates the overhead image for display IMc by trimming the first display range Ar1 arranged at the third front-rear position and the third left-right position of the overhead image BV generated by the overhead image generation unit 86 (S220). As illustrated in FIG. 7 or 8, the display image generation unit 90 generates the display image IMe including the overhead image for display IMc and the peripheral image IMd, and outputs the generated display image IMe to the display image output unit 92 (S222). The display image output unit 92 outputs and displays the acquired display image IMe to and on the display unit 38 (S224). Thereafter, the processing unit 64 repeats steps after the step S102.

When the passenger touches and selects the towing mode button Bt2, the towing determination unit 78 determines that the towing vehicle 10 tows the towed vehicle 20 (S106: Yes), and outputs the fact to the overhead image display range setting unit 88. The forward/backward determination unit 72 determines whether the towing vehicle 10 moves forward (S108). For example, the forward/backward determination unit 72 may determine whether the towing vehicle 10 moves forward based on the position information of the transmission unit 32 detected by the transmission unit sensor 52 acquired via the vehicle information acquisition unit 70. When the transmission unit 32 is set to be reverse and moves backward, the forward/backward determination unit 72 determines that the towing vehicle 10 does not move forward based on the position information of the transmission unit 32 (S108: No), and outputs the fact that the towing vehicle moves backward to the overhead image display range setting unit 88. When the fact that the towed vehicle 20 is towed and the fact that the towing vehicle 10 moves backward is acquired, the overhead image display range setting unit 88 selects the second display range Ar2 as the trimming range and selects the first front-rear position and the third left-right position as the trimming position, and outputs the selected second display range Ar2 and the selected first front-rear position and third left-right position to the display image generation unit 90 (S204).

The display image generation unit 90 generates the overhead image for display IMc by trimming the second display range Ar2a arranged at the first front-rear position and the third left-right position of the overhead image BV generated by the overhead image generation unit 86 (S220). As illustrated in FIG. 10, the display image generation unit 90 generates the display image IMe including the overhead image for display IMc on which the towed image IMg, the guide button Bt3, and the like are superimposed and the peripheral image IMd, and outputs the generated display image IMe to the display image output unit 92 (S222). Note that the display image generation unit 90 generates the display image IMe illustrated in FIG. 14 when the steps after step S102 are repeated after the target parking position is set, as described later. The display image output unit 92 outputs and displays the acquired display image IMe to and on the display unit 38 (S224). Thereafter, the processing unit 64 repeats steps after the step S102.

When a driver sets the transmission unit 32 to be drive or the like, the forward/backward determination unit 72 determines that the towing vehicle 10 moves forward (S108: Yes), and outputs the fact that the towing vehicle moves forward to the overhead image display range setting unit 88. The parking mode determination unit 80 determines whether the parking mode is set (S110). For example, the parking mode determination unit 80 may determine whether the parking mode is set by touching the guide button Bt3 by the passenger acquired via the input information acquisition unit 76. When the passenger does not touch the guide button Bt3 or the passenger has touched the cancel button Bt5, it is determined that the parking mode is not set (S110: No). When the fact that the towed vehicle 20 is towed, the fact that the towing vehicle 10 moves forward, and the fact that the parking mode is not set are acquired, the overhead image display range setting unit 88 selects the second display range Ar2 as the trimming range and selects the first front-rear position and the third left-right position as the trimming position, and outputs the selected second display range Ar2 and the selected first front-rear position and third left-right position to the display image generation unit 90 (S204). The display image generation unit 90 generates the overhead image for display IMc by trimming the second display range Ar2a arranged at the first front-rear position and the third left-right position (S220). As illustrated in FIG. 9, the display image generation unit 90 generates the display image IMe including the overhead image for display IMc on which the towed image IMg, the guide button Bt3, and the like are superimposed and the peripheral image IMd (S222). The processing unit 64 executes steps after the step S224 described above, and displays the display image IMe on the display unit 38 and then repeats steps after the step S102.

When the passenger touches and selects the guide button Bt3, the parking mode determination unit 80 determines that the parking mode is selected (S110: Yes), and outputs the fact that the parking mode is selected to the target parking position setting unit 84 and the overhead image display range setting unit 88. When the fact that the parking mode is selected is acquired, the target parking position setting unit 84 sets the target parking position based on the captured image acquired from the image acquisition unit 82, and outputs the set target parking position to the overhead image display range setting unit 88 (S112).

Next, the parking mode determination unit 80 determines whether the target parking position is selected (S114). For example, the parking mode determination unit 80 may determine whether the target parking position is selected by the operation of the next button Bt4 by the passenger acquired via the input information acquisition unit 76. When the passenger does not touch the next button Bt4, the parking mode determination unit 80 determines that the target parking position is not selected (S114: No), and outputs the fact that the target parking position is not yet selected to the overhead image display range setting unit 88. When the fact that it is determined that the towed vehicle 20 is towed is acquired from the towing determination unit 78, and the fact that the target parking position is not selected in the forward and parking modes are acquired from the parking mode determination unit 80, the overhead image display range setting unit 88 selects the second display range Ar2 as the trimming range and selects the second front-rear position and the third left-right position as the trimming positions, and output the selected second display range Ar2 and the selected front-rear position and third left-right position to the display image generation unit 90 (S206).

The display image generation unit 90 generates the overhead image for display IMc by trimming the second display range Ar2*b* arranged at the second front-rear position and the third left-right position of the overhead image BV generated by the overhead image generation unit 86 (S220). As illustrated in FIG. 11, the display image generation unit 90 generates the display image IMe including the overhead image for display IMc on which the target position image IMj and the buttons Bt4 and Bt5 and the like are superimposed and the peripheral image IMd, and outputs the generated display image IMe to the display image output unit 92 (S222). The display image output unit 92 outputs and displays the acquired display image IMe to and on the display unit 38 (S224). Thereafter, the processing unit 64 repeats steps after the step S102.

When the passenger touches and selects the next button Bt4, the parking mode determination unit 80 determines that the target parking position is selected (S114: Yes), and outputs the fact that the target parking position is selected to the overhead image display range setting unit 88. The target parking position direction determination unit 74 determines whether the selected target parking position is on the left (S116). For example, the target parking position direction determination unit 74 may determine whether the target parking position is on the left based on the position information of the direction indication switch 34 acquired via the vehicle information acquisition unit 70. When the right direction indicator 16 lights up, the target parking position direction determination unit 74 determines that the selected target parking position is on the right and not on the left based on the position information of the direction indication switch 34 (S116: No), and outputs the fact that the selected target parking position is on the right to the overhead image display range setting unit 88. When the fact that the towed vehicle 20 is towed, the fact that the right target parking position is selected in the forward and parking modes, the overhead image display range setting unit 88 selects the second display range Ar2 as the trimming range and selects the second front-rear position and the first left-right position as the trimming position and outputs the selected second display range Ar2 and the selected second front-rear position and first left-right position to the display image generation unit 90 (S208).

The display image generation unit 90 generates the overhead image for display IMc by trimming the second display range Ar2*c* arranged at the second front-back position and the first left-right position of the overhead image BV generated by the overhead image generation unit 86 (S220). As illustrated in FIG. 12, the display image generation unit 90 generates the display image IMe including the overhead image for display IMc on which the guide button Bt3 and the like are superimposed, the target position image IMj is shifted toward the center in the left-right direction, and the host vehicle image IMf is shifted to the left and the peripheral image IMd, and outputs the generated display image to the display image output unit 92 (S222). The display image output unit 92 outputs and displays the acquired display image IMe to and on the display unit 38 (S224). Thereafter, the processing unit 64 repeats steps after the step S102.

When the left direction indicator 16 lights up, the target parking position direction determination unit 74 determines that the selected target parking position is on the left based on the position information of the direction indication switch 34 (S116: Yes) and outputs the fact that the selected target parking position is on the left to the overhead image display range setting unit 88. When the fact that the towed vehicle 20 is towed, the fact that the left target parking position is selected in the forward and parking modes, the overhead image display range setting unit 88 selects the second display range Ar2 as the trimming range and selects the second front-rear position and the second left-right position as the trimming position and outputs the selected second display range Ar2 and the selected second front-rear position and second left-right position to the display image generation unit 90 (S210).

The display image generation unit 90 generates the overhead image for display IMc by trimming the second display range Ar2*d* arranged at the second front-rear position and the second left-right position of the overhead image BV generated by the overhead image generation unit 86 (S220). As illustrated in FIG. 13, the display image generation unit 90 generates the display image IMe including the overhead image for display IMc on which the guide button Bt3 and the like are superimposed, the target position image IMj is shifted toward the center in the left-right direction, and the host vehicle image IMf is shifted to the right and the peripheral image IMd, and outputs the generated display image IMe to the display image output unit 92 (S222). The display image output unit 92 outputs and displays the acquired display image IMe to and on the display unit 38 (S224). Thereafter, the processing unit 64 repeats steps after the step S102.

As described above, in the parking assistance device 60, when it is determined that the towed vehicle 20 is towed, the overhead image display range setting unit 88 selects the second display range Ar2 wider than the first display range Ar1, and display image generation unit 90 trims the second display range Ar2 of the overhead image BV generated from the captured image as the overhead image for display IMc. Thereby, when the towing determination unit 78 determines that the towed vehicle 20 is towed, the parking assistance device 60 can display the display image IMe including the overhead image for display IMc in the real world than the case where it is determined that the towed vehicle is not towed. As a result, the parking assistance device 60 can provide the display image IMe in which the periphery of the towing vehicle 10 and the towed vehicle 20 is easily visible even when the entire vehicle is long by towing the towed vehicle 20.

In the parking assistance device 60, when it is determined that the towed vehicle 20 is towed, the overhead image display range setting unit 88 selects the second display range Ar2 having a wider range in the left-right direction than the first display range Ar1. The display image generation unit 90 generates the overhead image for display IMc by trimming the second display range Ar2 of the overhead image BV generated from the captured image. Accordingly, the parking assistance device 60 can provide the passenger with the display image IMe in which the periphery of the towing vehicle 10 including obstacles and the like on the right and left thereof is more easily visible even when the area where the towing vehicle 10 is blocked by the towed vehicle 20 while turning increases.

In the parking assistance device 60, when the towing vehicle 10 moves backward, the overhead image display range setting unit 88 sets the trimming range set in the second display range Ar2 at the first front-rear position behind the center of the overhead image BV. Thereby, the parking assistance device 60 can more easily see the display image IMe by the overhead image for display IMc that includes more rear images in the traveling direction. Furthermore, since the parking assistance device 60 selects the wider second display range Ar2, it is possible to reduce the decrease in the number of front and left and right images while increasing the number of rear images, and as a result, it is possible to provide the display image IMe in which obstacles or the like is easily visible in directions other than the rear direction.

In the parking assistance device 60, when the towed vehicle 20 is towed, the instruction of the parking mode is received, and the towing vehicle 10 moves forward, the overhead image display range setting unit 88 sets the trimming range set in the second display range Ar2 at the second front-rear position ahead of the center of the overhead image BV. Thereby, the parking assistance device 60 can provide the display image IMe in which the forward direction that is the traveling direction and the target parking position are easily visible by the overhead image for display IMc that includes more front images in the traveling direction and is superimposed with the target position image IMj.

In the parking assistance device 60, when the towed vehicle 20 is towed, the instruction of the parking mode is received, the towing vehicle 10 moves forward, and the target parking position is selected, the overhead image display range setting unit 88 sets the trimming range set in the second display range Ar2 on the target parking position side. Thereby, the parking assistance device 60 can increase the probability that the towing vehicle 10 and the towed vehicle 20 and the selected target parking position are included in the overhead image for display IMc. As a result, the parking assistance device 60 can provide the display image IMe including more images near the selected target parking position and the overhead image for display IMc on which the target position image IMj is superimposed even when the towing vehicle 10 moves backward while turning. Therefore, the parking assistance device 60 can provide the display image IMe in which obstacles in front of the traveling direction and near the selected target parking position are more easily visible, and the positional relationship between the towing vehicle 10 and the towed vehicle 20 and the selected target parking position, and the like are easily grasped.

In the parking assistance device 60, the display image generation unit 90 generates the display image IMe including the peripheral image IMd of the towing vehicle 10 in the traveling direction together with the overhead image for display IMc. Thereby, the parking assistance device 60 can provide the display image IMe in which the situation of the traveling direction is easily visible even when one area of the front or rear of the overhead image for display IMc increases and the other area thereof decreases by moving the trimming range forward and backward within the overhead image BV.

Next, a modified example in which a part of the display image IMe is changed will be described.

First Modified Example

Figure 17:
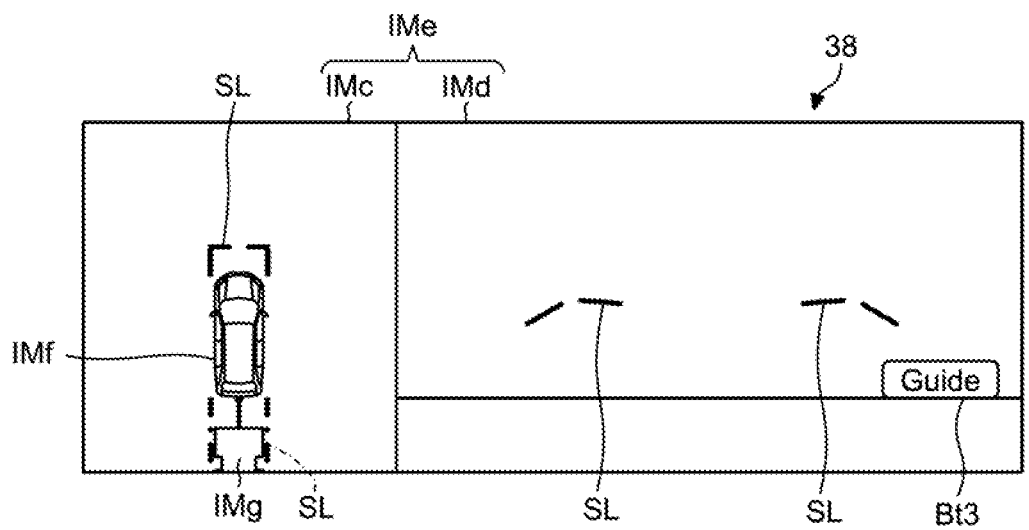
FIG. 17 is a schematic diagram illustrating an example of a display image of a first modified example in the parking assistance device according to the first embodiment.

FIG. 17 is a diagram illustrating an example of a display image IMe of a first modified example of the first embodiment. An overhead image display range setting unit 88 may select a second display range Ar2 when a towing determination unit 78 determines that a towed vehicle 20 is towed, and set a center of a trimming range at a second front-rear position as the second display area Ar2b illustrated in FIG. 6, when a towing vehicle 10 moves forward. In this case, as illustrated in FIG. 17, the display image generation unit 90 generates the display image IMe including an overhead image for display IMc in which a host vehicle image IMf is arranged behind a center. Thereby, the parking assistance device 60 can more easily see the display image IMe by the overhead image for display IMc that includes more front images in a traveling direction.

Second Modified Example

Figure 18:
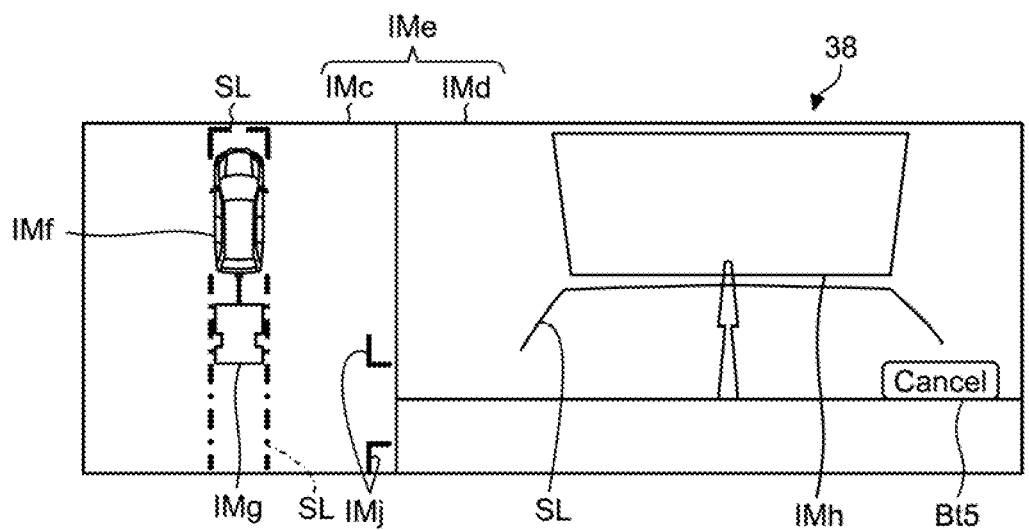
FIG. 18 is a schematic diagram illustrating an example of a display image of a second modified example in the parking assistance device according to the first embodiment.

FIG. 18 is a diagram illustrating an example of a display image IMe of a second modified example of the first embodiment. An overhead image display range setting unit 88 selects the second display range Ar2, when a towing determination unit 78 determines that a towed vehicle 20 is towed, in addition, when a parking mode is set, and a towing vehicle 10 moves backward, may set a center of a trimming range at a first front-rear position as in a second display range Ar2a illustrated in FIG. 6. In this case, as illustrated in FIG. 18, a display image generation unit 90 generates a display image IMe including an overhead image for display IMc that has a host vehicle image IMf arranged ahead of a center and is superimposed with a target position image IMj. Thereby, the parking assistance device 60 can provide the display image IMe in which a backward direction that is the traveling direction and the target parking position are easily visible by the overhead image for display IMc that includes more rear images in the traveling direction and is superimposed with the target position image IMj.

The function, connection relationship, number, arrangement, and the like of the configuration of the first embodiment described above may be appropriately changed or deleted within the scope of the invention and the scope equivalent to the scope of the invention. The first embodiment and the modified example may be appropriately combined. The order of each step of the embodiment may be changed as appropriate.

For example, in the above-described first embodiment, an example has been described in which the towing determination unit 78 determines that the towed vehicle 20 is towed when the towing mode is set by a passenger, but the towing determination unit 78 may determine whether the towed vehicle 20 is towed by another method. For example, the towing determination unit 78 may determine whether the towing vehicle 10 tows the towed vehicle 20 based on a captured image behind the towing vehicle 10 captured by an imaging unit 14b. Note that the towing determination unit 78 may determine whether the towing vehicle 10 tows the towed vehicle 20 based on distance measurement information or the like behind the towing vehicle 10 by a distance measurement sensor or the like, instead of the captured image.

In the first embodiment described above, an example is given in which the second display range Ar2 is wider than the first display range Ar1 in both the left-right direction and the front-rear direction, but a shape of the second display range Ar2 is not limited thereto. For example, the second display range Ar2 may be wider than first display range Ar1 in the left-right direction. In addition, the second display range Ar2 may be wider than first display range Ar1 in the front-rear direction.

In the first embodiment described above, an example has been described in which the overhead image display range setting unit 88 selects the trimming range from the two display ranges of the first display range Ar1 and the second display range Ar2, but the number of display ranges is not limited to two. For example, the overhead image display range setting unit 88 may select the trimming range from three or more display ranges including the first display range Ar1 and the second display range Ar2.

In the first embodiment described above, the method for determining, by a target parking position direction determination unit 74, left and right positions of a target parking position based on a direction indicated by a direction indicator 16 has been described, but the method for determining, by a target parking position direction determination unit 74, left and right positions of a target parking position is not limited thereto. For example, the target parking position direction determination unit 74 may determine the position of the left-right direction of the target parking position selected by the passenger based on the target parking position displayed on the display image when the passenger is selected.

Second Embodiment

Hereinafter, a second embodiment will be described in detail. Note that a parking assistance device 60 (also referred to as a peripheral monitor device) according to the second embodiment can be mounted on a towing vehicle 10 illustrated in FIG. 1 as in the first embodiment, and for example, can display an image for parking assistance (peripheral monitoring) on a display unit 38. In addition, a basic configuration of a parking assistance system (peripheral monitoring system) including the parking assistance device (peripheral monitor device) according to the second embodiment is the same as that of the parking assistance system 50 according to the first embodiment, and therefore will be appropriately described with reference to FIGS. 1 to 3.

Figure 19:
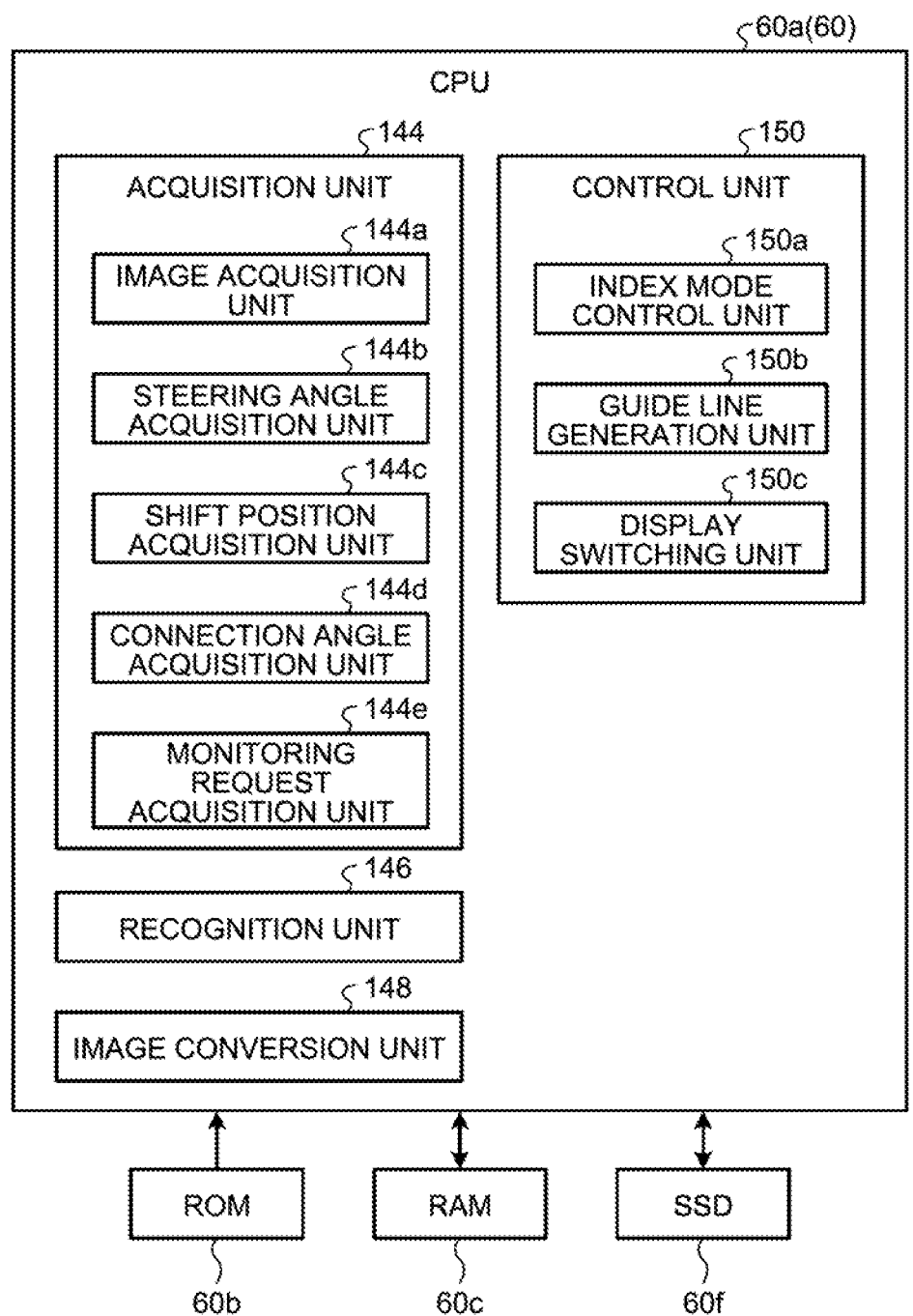
FIG. 19 is an exemplary block diagram of a configuration of CPU in the parking assistance device (peripheral monitor device) according to the second embodiment.

FIG. 19 is an exemplary block diagram of a configuration of a CPU 60a included in a parking assistance device 60 (peripheral monitor device) according to the second embodiment. The CPU 60a includes various modules that implement processing of recognizing a towed vehicle 20 connected to the towing vehicle 10, displaying an index indicating a recognition result, and changing a display mode. Various modules are implemented by the CPU 60a that reads a program provided and stored in a storage device such as a ROM 60b and executes the program. For example, as illustrated in FIG. 19, the CPU 60a includes modules such as an acquisition unit 144, a recognition unit 146, an image conversion unit 148, and a control unit 150.

The acquisition unit 144 acquires, for example, a captured image obtained by capturing an image of a rear area of the towing vehicle 10 from the towing vehicle 10 to which the towed vehicle 20 can be connected. Specifically, the acquisition unit 144 acquires various types of information used to display, for example, a trailer icon (towed image IMg of the first embodiment) as an index indicating whether the towed vehicle 20 is recognized or display a guide line (for example, a guide line, a movement position prediction line (assistance line SL in the first embodiment), or the like) indicating a moving direction of the towing vehicle 10 together with indicating that the towed vehicle 20 is recognized. The acquisition unit 144 includes, for example, an image acquisition unit 144a, a steering angle acquisition unit 144b, a shift position acquisition unit 144c, a connection angle acquisition unit 144d, a monitoring request acquisition unit 144e, and the like.

Figure 20:
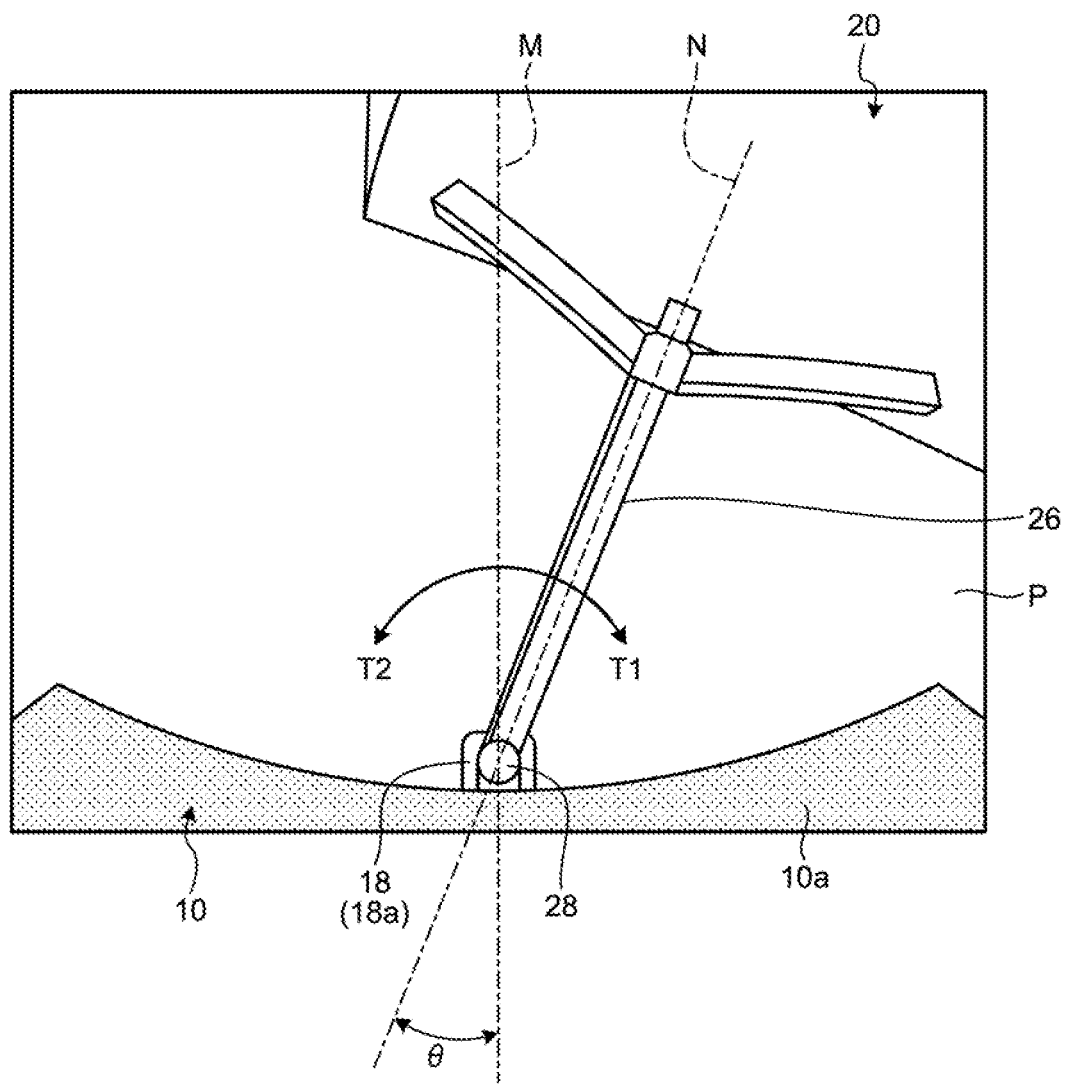
FIG. 20 is a schematic diagram illustrating an image of a connection portion between the towing vehicle and the towed vehicle captured by an imaging unit of a parking assistance (peripheral monitoring) system including the parking assistance device (peripheral monitor device) according to the second embodiment, and an example of an image when the towed vehicle is connected to the towing vehicle by a connection angle θ.

The image acquisition unit 144a acquires a rear image (image of a rear region) of the towing vehicle 10 captured by an imaging unit 14b that is provided at the rear portion of the towing vehicle 10. FIG. 20 is an example of an image P (rear image) based on captured image data captured by the imaging unit 14b. The imaging unit 14b is fixed to the rear portion of the towing vehicle 10, and a capturing direction and a capturing range are fixed. Therefore, a rear bumper 10a of the towing vehicle 10, a traction device 18 (hitch ball 18a), and the like are projected at a predetermined position (lower end region in the case of FIG. 20) of image P captured by the imaging unit 14b. In addition, when the towed vehicle 20 is connected to the towing vehicle 10, in the image P, a part of a front portion of the towed vehicle 20 and a connection unit member 26 (coupler 28) are projected in a predetermined area based on the rear bumper 10a and the like. The image P illustrated in FIG. 20 indicates a state in which the connection unit member 26 (towed vehicle 20 and coupler 28) turns (curved and towed), for example, in a direction of arrow T1 and becomes a connection angle θ (angle between a vehicle center axis M and a connection center axis N) based on the traction device 18 (hitch ball 18a) of the towing vehicle 10 as a fulcrum. In this case, the towed vehicle 20 turns (curved) to the left as viewed from a driver's seat of the towing vehicle 10. By performing image processing on the image P, the CPU 60a can recognize the towed vehicle 20 and detect the connection angle θ. In addition, the image acquisition unit 144a can acquire a front image of the towing vehicle 10 captured by the imaging unit 14a provided on a front bumper 10b of the towing vehicle 10, and the CPU 60a can display, on a display unit 38, a front image captured by the imaging unit 14a, for example, when the towing vehicle 10 travels forward. Note that the image acquisition unit 144a may further acquire captured image data from the imaging units 14c and 14d that capture left and right images of the towing vehicle 10. As described above, the image acquisition unit 144a acquires the front image and the left and right images in addition to the rear image, so the CPU 60a can generate a vehicle peripheral image (for example, overhead image) indicating a peripheral state of the towing vehicle 10.

The steering angle acquisition unit 144b acquires a steering angle of the towing vehicle 10 detected by the steering unit sensor 54 (steering angle sensor). That is, the steering angle in a direction in which a driver is about to drive the towing vehicle 10 (towed vehicle 20) is acquired. In addition, the shift position acquisition unit 144c acquires whether the towing vehicle 10 can move forward or move backward based on a position of a movable unit of a shift operation unit output by a transmission unit sensor 52 (shift sensor). The steering angle acquisition unit 144b may refer to the acquisition result of the shift position acquisition unit 144c to identify whether a current steering angle is a steering angle in a forward movable state or a steering angle in a backward movable state. The connection angle acquisition unit 144d acquires the connection angle when the towed vehicle 20 is connected to the towing vehicle 10, that is, the angle of the connection unit member 26 (connection center axis N) of the towed vehicle 20 with respect to the vehicle center axis M of the towing vehicle 10. The connection angle acquisition unit 144d can detect the connection unit member 26 (connection center axis N) by performing image processing on the image P (see FIG. 20) acquired by the image acquisition unit 144a. Then, the connection angle acquisition unit 144d detects a displacement angle in a turning direction (arrow T1 or arrow T2) of the connection unit member 26 (connection center axis N) with respect to the vehicle center axis M, and as a result, can acquire the connection angle θ between the towing vehicle 10 and the towed vehicle 20. In another embodiment, when the traction device 18 includes an angle detection sensor, the connection angle acquisition unit 144d may acquire the connection angle θ based on a detection value of the angle detection sensor.

The monitoring request acquisition unit 144e acquires information indicating whether a shift to a peripheral monitoring mode that monitors whether the towed vehicle 20 is recognized is requested for the parking assistance system 50 (peripheral monitoring system). The monitoring request acquisition unit 144e can receive, for example, a signal indicating whether a shift to the peripheral monitoring mode is requested via the operation input unit 42 operated by the driver.

The recognition unit 146 recognizes, for example, the connected towed vehicle 20 based on the captured image. Specifically, the recognition unit 146 recognizes (detects) the towed vehicle 20 that can be connected to the towing vehicle 10 by performing the known image processing on the image P (rear image) captured by the imaging unit 14b acquired by the image acquisition unit 144a. The recognition unit 146 can perform a shape recognition of the towed vehicle 20 by comparing sample shapes stored in the ROM 60b or an SSD 60f, and can consider that the towed vehicle 20 is connected to the towing vehicle 10, that is, the parking assistance system 50 recognizes the towed vehicle 20 when it is determined that the towed vehicle 20 exists in a predetermined area of the image P. In addition, when a part of the towed vehicle 20, for example, a target mark attached to a front end face is detected in a predetermined area in the image P, the recognition unit 146 may consider that the towed vehicle 20 is connected to the towing vehicle 10, that is, the recognition is performed. In another embodiment, the recognition unit 146 may consider that the towed vehicle 20 is connected to the towing vehicle 10, that is, the recognition is performed by detecting a rod-shaped connection unit member 26 connected to the traction device 18 in the image P. Therefore, when at least one of the towed vehicle 20, a target mark, and the connection unit member 26 cannot be detected in the image P, the recognition unit 146 determines that the towed vehicle 20 is in the non-recognition (non-detection) state. Note that even when images matching shapes of the towed vehicle 20, the target mark, the connection unit member 26, and the like are detected in the image P, in the case where the images are not included in a predetermined area (for example, direction and position based on the rear bumper 10a), the recognition unit 146 determines that the towed vehicle 20 exists around the towing vehicle 10 but is not connected to the towing vehicle 10. Even in this case, the recognition unit 146 determines that the towed vehicle 20 is in the non-recognition (non-detection) state.

Figure 21:
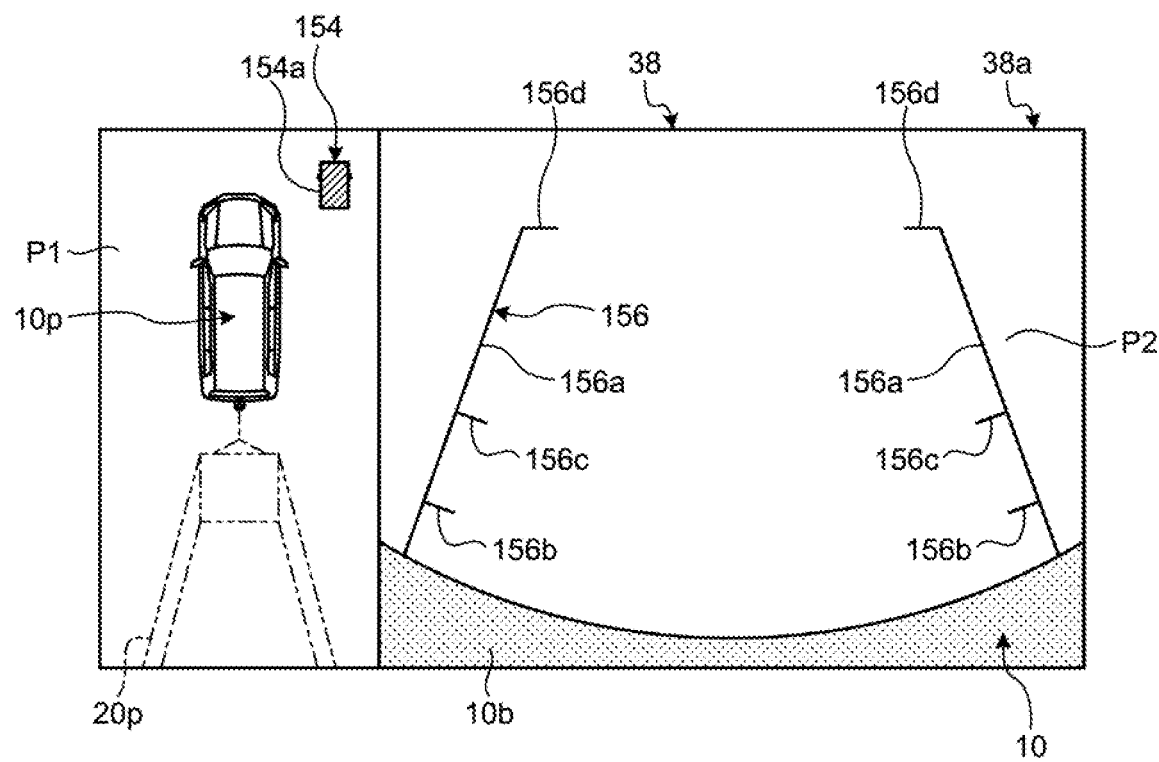
FIG. 21 is a schematic diagram illustrating an example of an image indicating a case where an index indicating the towed vehicle is not displayed when the towed vehicle cannot be recognized in the parking assistance device according to the second embodiment.
Figure 22:
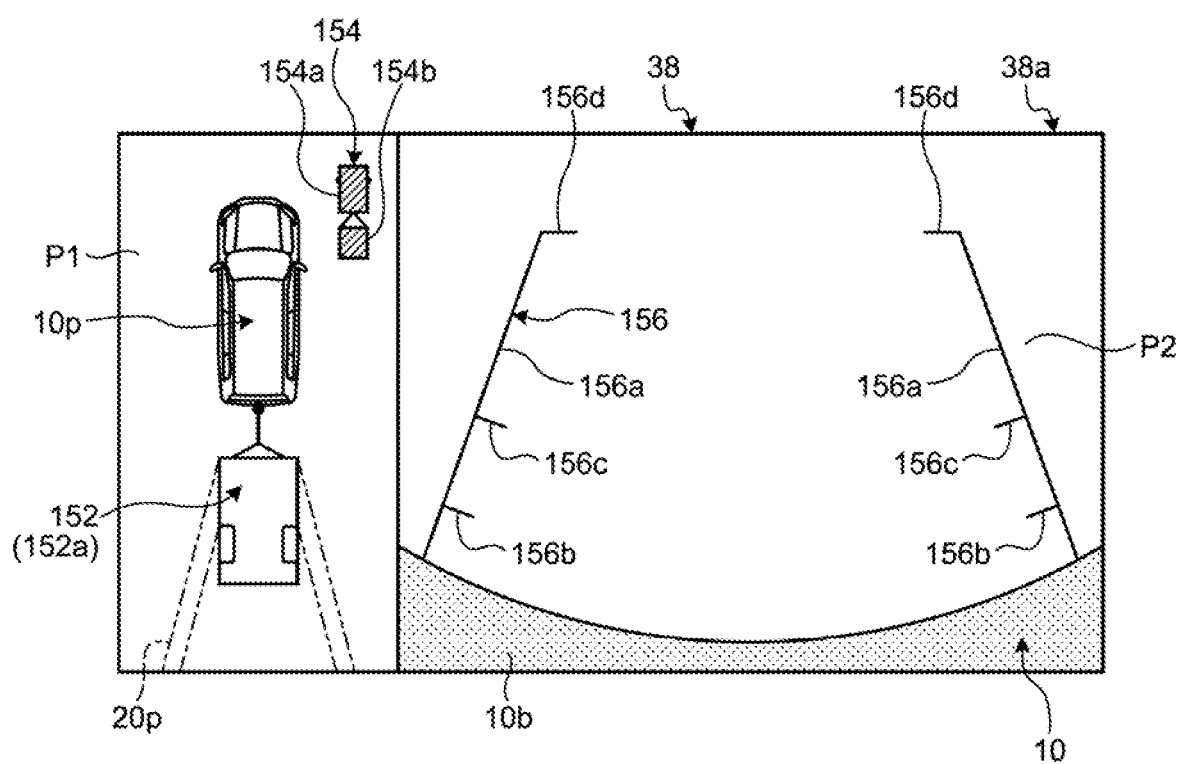
FIG. 22 is a schematic diagram illustrating an example of an image indicating a case where an index indicating the towed vehicle is displayed when the towed vehicle is recognized in the parking assistance device according to the second embodiment.

The image conversion unit 148 can perform viewpoint conversion and synthesis of captured image data of the rear image of the towing vehicle 10 captured by the imaging unit 14b or captured image data of the front image of the towing vehicle 10 captured by the imaging unit 14a, captured image data of left and right images captured by left and right imaging units (imaging units 14c and 14d), and the like, and as a result, convert the captured image data into an overhead image as if the towing vehicle 10 looks down from above. FIGS. 21 and 22 illustrate an example in which an overhead image P1 converted by the image conversion unit 148, and a real image P2 (in the case of FIGS. 21 and 22, real image P2 of a front image captured by the imaging unit 14a) captured by the imaging unit 14b or the imaging unit 14a are displayed on a screen 38a of the display unit 38 in parallel. When a control state of the parking assistance system 50 shifts to the peripheral monitoring mode, the screen 38a of the display unit 38 is switched from a normally displayed navigation screen or an audio screen to the peripheral monitoring screen as illustrated in FIG. 21. When a host vehicle image 10p (host vehicle image IMf of the first embodiment) corresponding to the towing vehicle 10 is displayed and the towed vehicle 20 is projected to the captured image data captured by the imaging unit 14b as illustrated in FIG. 20, a trailer image 20p (towed image IMg) is included in the overhead image P1. In this case, when the towed vehicle 20 captured by the imaging unit 14b is converted into two-dimensional data, the trailer image 20p extends rearward. Note that in the rear image captured by the imaging unit 14b of the second embodiment, the towing vehicle 10 only projects the rear bumper 10a and the traction device 18. In addition, when the overhead image P1 is generated, the front image or the left and right images used in addition to the rear image include only a part of the towing vehicle 10. Therefore, information (shape data) on the host vehicle image 10p cannot be acquired from each captured image data. Therefore, when the overhead image P1 is displayed, the image conversion unit 148 reads the display data of the host vehicle image 10p stored in the ROM 60b or the like in advance, and superimposes and displays the display data on the overhead image P1 (two-dimensional data). As a result, it is possible to display an image in which the host vehicle image 10p and the trailer image 20p are connected on the overhead image P1 (vehicle peripheral image). The image conversion unit 148 converts only the captured image data of the rear image, for example, from three-dimensional data into two-dimensional data, and generates the simple overhead image P1 as if the rear part of the towing vehicle 10 is viewed from above and display the overhead image P1 on the display unit 38, so the same effect can be obtained.

The control unit 150 determines whether the towed vehicle 20 cannot be detected, for example, based on the recognition result of the recognition unit 146, and determines and displays the display mode of the index indicating the state of the towing vehicle 10 or the towed vehicle 20 according to the determination result. Further, for example, when the recognition unit 146 cannot recognize the towed vehicle 20, the control unit 150 does not display the index.

In addition, for example, when the towing vehicle 10 moves backward based on the steering angle of the towing vehicle 10, the control unit 150 superimposes and displays a movement position prediction line as an index on the captured image based on the current steering angle of the towing vehicle 10, and makes the display mode of the movement position prediction line different between when the towed vehicle 20 is recognized and when the towed vehicle 20 is not recognized. In addition, for example, when the acquisition unit 144 acquires an image around the towing vehicle 10, the control unit 150 can display a vehicle mark indicating the towed vehicle 20 as the index. In this case, the control unit 150 superimposes and displays the vehicle mark on the display corresponding position of the towed vehicle 20 in the vehicle peripheral image based on the peripheral image. In this way, the control unit 150 mainly includes a module such as an index mode control unit 150a, a guide line generation unit 150b, and a display switching unit 150c to execute the control of the element to be superimposed and displayed on the screen 38a of the display unit 38 while the peripheral monitoring mode is being executed.

The index mode control unit 150a performs the display control of the index indicating whether the towed vehicle 20 connected to the towing vehicle 10 is recognized based on the recognition result of the recognition unit 146, and execute control to change the display mode of the index according to the recognition state of the towed vehicle 20.

Figure 23:
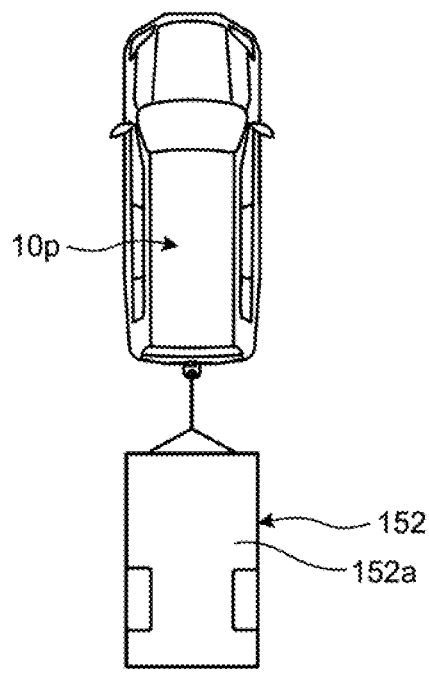
FIG. 23 is a schematic diagram illustrating an example of a display mode of an index indicating the towed vehicle displayed when the towed vehicle is recognized in the parking assistance device according to the second embodiment.
Figure 24:
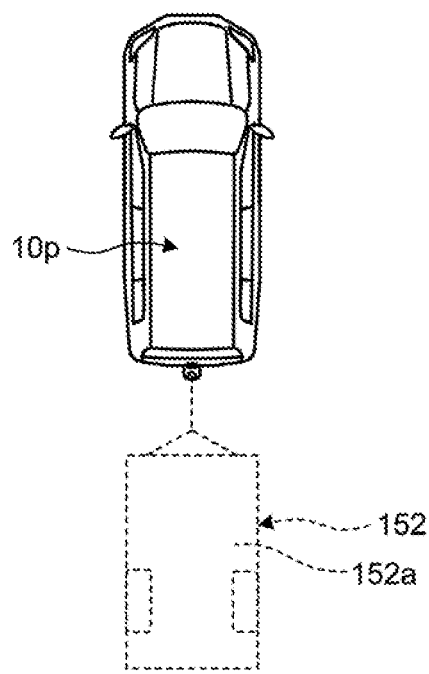
FIG. 24 is a schematic diagram illustrating an example of a display mode of an index indicating the towed vehicle displayed when the towed vehicle cannot be recognized in the parking assistance device according to the second embodiment.
Figure 25:
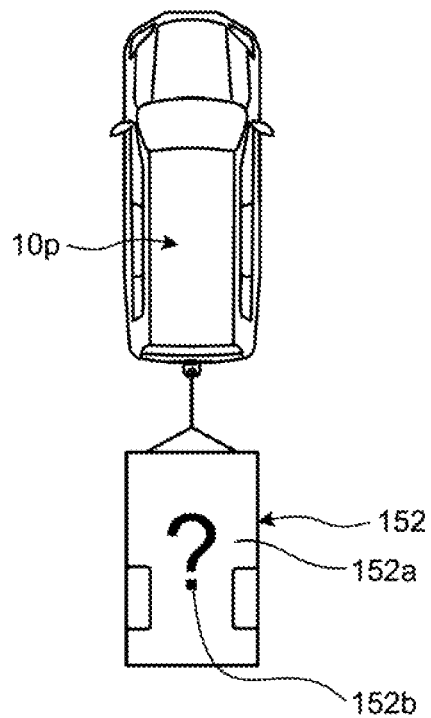
FIG. 25 is a schematic diagram illustrating another example of the display mode of the index indicating the towed vehicle displayed when the towed vehicle cannot be recognized in the parking assistance device according to the second embodiment.

FIGS. 23 to 25 illustrate display examples in which a trailer icon 152a (vehicle mark) as an index 152 indicating whether the towed vehicle 20 connected to the towing vehicle 10 is recognized, in which the display mode is controlled by the index mode control unit 150a. When the towed vehicle 20 is recognized, as illustrated in FIG. 23, the trailer icon 152a is displayed in the connected state behind the host vehicle image 10p. In this case, for example, the trailer icon 152a lights up and is displayed to clearly indicate the state where the trailer icon 152a is connected to the host vehicle image 10p. That is, it is possible to clearly display that the towed vehicle 20 is in the recognition (detection) state.

FIG. 24 illustrates the trailer icon 152a displayed in the case where the recognition unit 146 cannot recognize the towed vehicle 20 connected to the towing vehicle 10. In this case, the trailer icon 152a is blinked, for example, to make it easier to pay attention to the trailer icon 152a. That is, it is possible to clearly display that the towed vehicle 20 is in the recognition (detection) state. When the towed vehicle 20 cannot be recognized, the trailer icon 152a may not be displayed. In the peripheral monitoring mode that mainly monitors the connection state of the towed vehicle 20, only the host vehicle image 10p of the host vehicle image 10p and the trailer icon 152a that are to be displayed when the towed vehicle 20 is connected to the towing vehicle 10 is displayed (the trailer icon 152a is not displayed), and therefore, it is easy to give a strong impression to the driver and it is easier for the driver to recognize that the towed vehicle 20 is in a non-recognition (non-detection) state.

FIG. 25 illustrates the trailer icon 152a displayed in the case where the recognition unit 146 cannot recognize the towed vehicle 20 connected to the towing vehicle 10. In this case, the host vehicle image 10p and the trailer icon 152a are displayed in the same manner as in the recognition in FIG. 23, but the display mode of the trailer icon 152a is different from that in the recognition. In the case of the example of FIG. 25, the trailer icon 152a is attached with an emphasis mark 152b, for example, "?", and it is easy to recognize that the towed vehicle 20 is in the non-recognition state. Note that the display mode of the trailer icon 152a in the non-recognition illustrated in FIGS. 24 and 25 is an example, and can be changed as appropriate if the display mode in the non-recognition is distinguished from the display mode in the recognition illustrated in FIG. 23. For example, when the display mode of the trailer icon 152a is changed, the index mode control unit 150a changes a display color of the trailer icon 152a, changes (for example, decreases) display luminance, or changes a transmittance factor (for example, increases the transmittance), so the same effect can be obtained. Further, the display modes described above may be combined. For example, the example of FIG. 24 and the example of FIG. 25 may be combined, and the emphasis mark 152b may be added to the trailer icon 152a of the blinking display to further emphasize non-recognition.

When the towed vehicle 20 is recognized by the recognition unit 146, as illustrated in FIG. 22, such an index 152 (trailer icon 152a) is displayed on the overhead image P1 (vehicle peripheral image) of the screen 38a of the display unit 38. As described above, when the towed vehicle 20 is connected to the towing vehicle 10, the relative position between the host vehicle image 10p and the trailer image 20p is determined. When the recognition unit 146 can recognize the towed vehicle 20, the connection angle acquisition unit 144d can acquire the connection angle θ of the towed vehicle 20 with respect to the towing vehicle 10 recognized on the captured image data.

Therefore, the index mode control unit 150a can superimpose and display the trailer icon 152a in the state in which the connection angle of the index 152 (trailer icon 152a) with respect to the host vehicle image 10p displayed in the overhead image P1 is changed according to the connection angle θ between the towing vehicle 10 and the towed vehicle 20. In the case of FIG. 22, in a series state (in the state in which the vehicle center axis M of the towing vehicle 10 in the front-rear direction and the connection center axis N of the towed vehicle 20 (see FIG. 20) are superimposed) in which the towing vehicle 10 and the towed vehicle 20 are directly connected, the host vehicle image 10p, the trailer icon 152a, and the trailer image 20p are displayed. In this case, the trailer image 20p displayed as connected at the connection angle θ with respect to the host vehicle image 10p and the trailer icon 152a displayed as connected at the connection angle θ with respect to the host vehicle image 10p are superimposed and displayed. In other words, the trailer icon 152a is superimposed and displayed at the display corresponding position of the towed vehicle 20 in the overhead image P1 (captured image). Therefore, the driver checking the overhead image P1 can easily understand that the trailer image 20p and the trailer icon 152a indicate the same thing, and can easily understand that the parking assistance system 50 (peripheral monitoring system) recognizes the towed vehicle 20 without discomfort. In this way, when the recognition unit 146 cannot recognize the towed vehicle 20, the driver can understand that the towed vehicle 20 is not recognized by the control of the display mode (for example, non-display) of the trailer icon 152a. Furthermore, by checking the position where the trailer icon 152a is to be displayed on the overhead image P1, that is, the position of the trailer image 20p at the rear of the host vehicle image 10p, it is easy to simply recognize the connection angle θ and the like according to whether the towed vehicle 20 actually exists or in the case where the towing vehicle is connected to the towed vehicle 20.

On the other hand, when the recognition unit 146 cannot recognize the towed vehicle 20, the index mode control unit 150a changes the display mode of the index 152 (trailer icon 152*a*). For example, as described with reference to FIG. 24, the index 152 (trailer icon 152*a*) is not displayed. As a result, as illustrated in FIG. 21, the overhead image P1 can be clearly distinguished from the overhead image P1 in FIG. 22. As can be seen from the comparison of FIGS. 21 and 22, in the peripheral monitoring mode, the trailer icon 152*a* that is to be displayed when the towed vehicle 20 is connected to the towing vehicle 10 is not displayed, so it is easy for the driver to be strongly impressed and to more recognize that the towed vehicle 20 is in the non-recognition state.

As described above, despite the fact that the towed vehicle 20 is connected to the towing vehicle 10, in the parking assistance system 50 (peripheral monitoring system), even when the recognition unit 146 cannot recognize the towed vehicle 20, the trailer image 20*p* can be viewed in the overhead image P1. That is, even when the quality of the rear image captured by the imaging unit 14*b* is not good enough so that the towed vehicle 20 cannot be visually recognized in the image processing, the trailer image 20*p* may be unclear, but may be checked in the overhead image P1. As a result, by making the driver check the overhead image P1 (vehicle peripheral image), the state of the towed vehicle 20 can be checked from the image of the towed vehicle 20 included in the overhead image P1. As a result, for example, the presence or absence of the connection of the towed vehicle 20 or the approximate connection posture can be recognized.

The index mode control unit 150*a* may display an indicator 154 that simply displays the index 152 (trailer icon 152*a*) at a part of the overhead image P1 or at a position where the driver can easily see the overhead image P1. In the case of FIGS. 21 and 22, the indicator 154 is arranged at the upper right position of the overhead image P1. The indicator 154 includes a tractor indicator 154*a* and a trailer indicator 154*b*, and when the recognition unit 146 recognizes the towed vehicle 20, as illustrated in FIG. 22, the tractor indicator 154*a* and the trailer indicator 154*b* lights up and is displayed, for example. On the other hand, when the recognition unit 146 does not recognize the towed vehicle 20, as illustrated in FIG. 21, only the tractor indicator 154*a* lights up and is displayed. In this case, for example, by displaying the indicator 154 at luminance higher than that of the overhead image P1, the driver is easy to intuitively understand the recognition state of the towed vehicle 20.

It should be noted that the recognition unit 146 determines to be "non-recognition" when the towed vehicle 20 cannot be recognized as a result of performing the image processing on the rear image captured by the imaging unit 14*b*. In other words, when the recognition unit 146 cannot be recognized even when the towed vehicle 20 is connected to the towing vehicle 10 or when the towed vehicle 20 cannot be recognized because the towed vehicle 20 is not connected to the towing vehicle 10, it is determined to be "non-recognition". Therefore, the index mode control unit 150*a* can accurately notify the driver of the fact that the towed vehicle 20 cannot be recognized by the trailer icon 152*a* or the display mode of the indicator 154.

Returning to FIG. 19, the guide line generation unit 150*b* generates, based on the current steering of the towing vehicle 10, a guide line such as a movement position prediction line indicating a direction in which the towing vehicle 10 or the wheel 13 travels when the towing vehicle 10 travels, a standard line indicating a standard of a distance from an end portion of the towing vehicle 10 or a vehicle width (corresponding to an assistance line SL in the first embodiment). For example, when the guide line generation unit 150*b* acquires a signal indicating that the towing vehicle 10 is not in a backward movable state (for example, a shift position is P (parking), N (Neutral), D (drive), and the like), as illustrated in FIGS. 21 and 22, the guide line generation unit 150*b* generates, based on the acquisition result of the shift position acquisition unit 144*c*, a standard line 156 that is directed to the direction according to the steering angle of the towing vehicle 10 in the real image P2 and is one example of the guide line. The standard line 156 is, for example, constituted by a vehicle width guide line 156*a* of the towing vehicle 10 extending in the traveling direction based on the steering angle of the towing vehicle 10, and distance standard lines 156*b*, 156*c*, and 156*d* that are displayed in a small piece protruding in a vehicle width direction from a part of the vehicle width guide line 156*a* and indicate a front separation distance from the front bumper 10*b* of the towing vehicle 10. The distance standard line 156*b* is displayed at a separation distance of, for example, 0.5 m from the front bumper 10*b*, the distance standard line 156*c* is displayed at a separation distance of, for example, 1.0 m from the front bumper 10*b*, and the distance standard line 156*d* is displayed at a position corresponding to a separation distance of, for example, 2.5 m from the front bumper 10*b*. Note that the display mode of the standard line 156 is an example, and for example, the distance standard lines 156*b*, 156*c*, and 156*d* may be displayed as lines connected across the left and right vehicle width guide lines 156*a*, and a sense of distance can be recognized by making display colors of areas partitioned by the distance standard lines 156*b*, 156*c*, and 156*d* different. In addition, a length in front of the standard line 156 can be appropriately selected, and may be 2.5 m or more, or may be less than 2.5 m. In addition, three distance standard lines 156*b*, 156*c*, and 156*d* are shown, but may be less than three or four or more. Also, the interval can also be changed.

Figure 26:
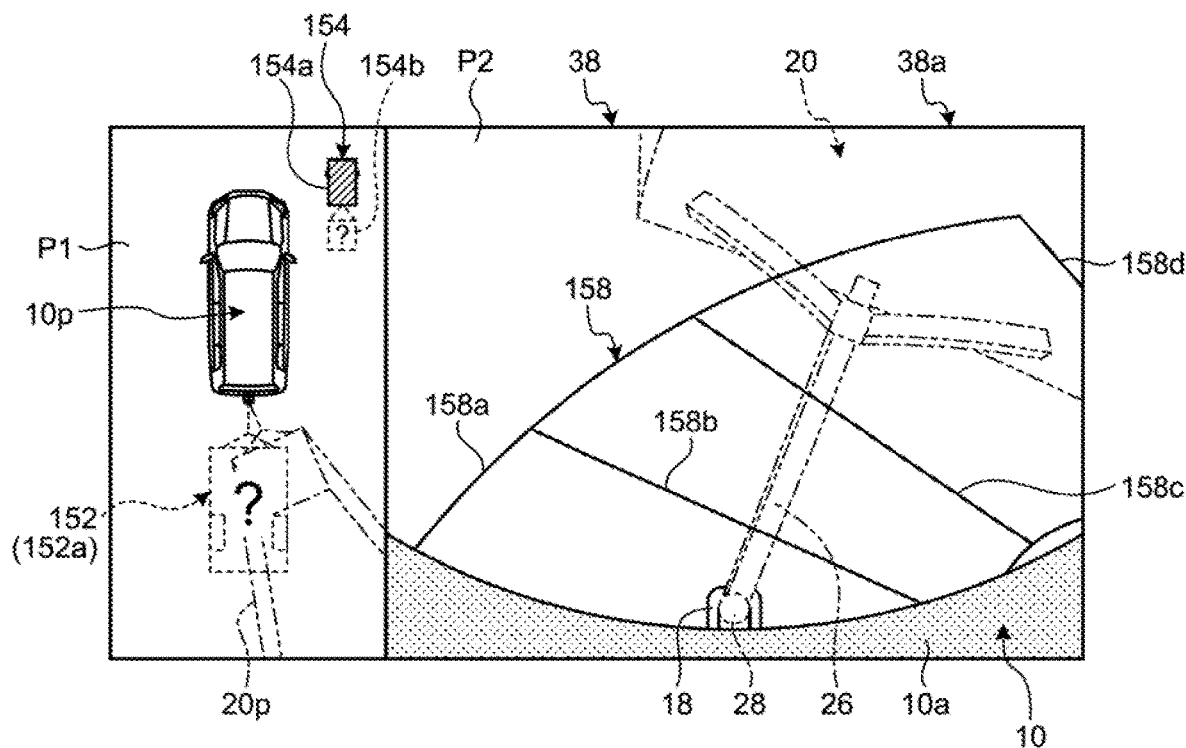
FIG. 26 is a schematic diagram illustrating an example of a display mode of the index indicating the towed vehicle displayed when the towed vehicle cannot be recognized and a display mode of a movement position prediction line of the towing vehicle when the towing vehicle moves backward, in the parking assistance device according to the second embodiment.
Figure 27:
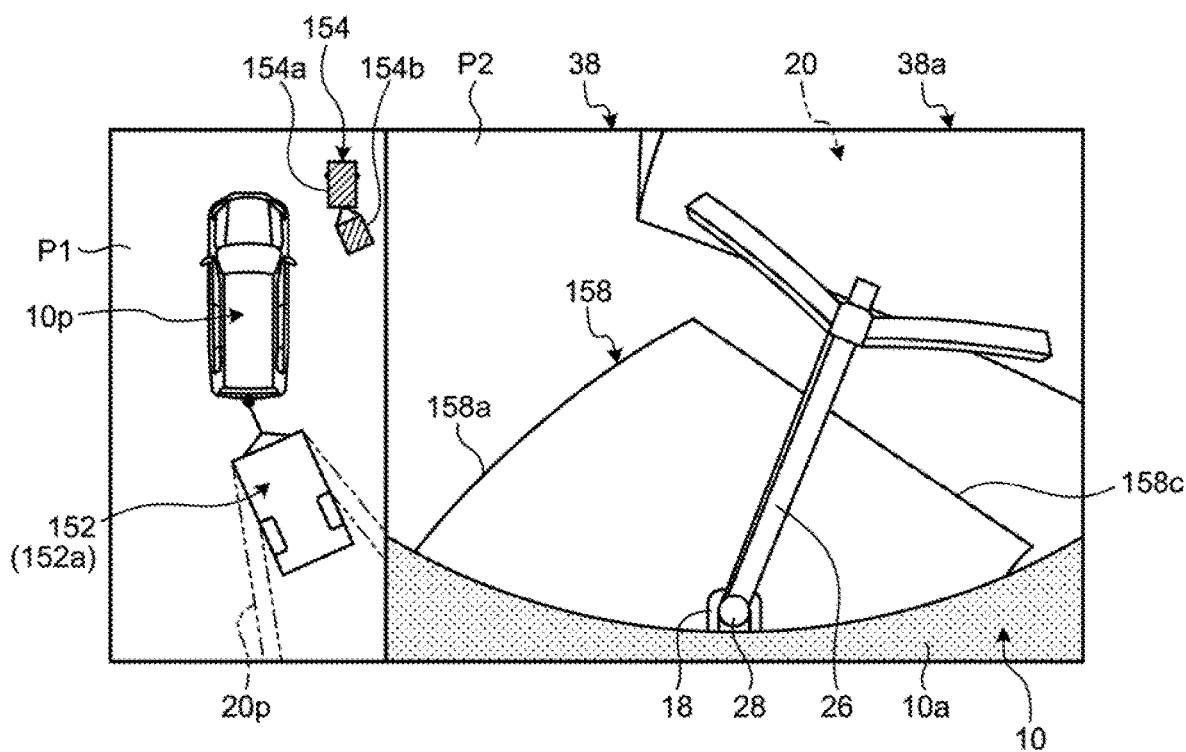
FIG. 27 is a schematic diagram illustrating an example of a display mode of the index indicating the towed vehicle displayed when the towed vehicle is recognized and a display mode of a movement position prediction line of the towing vehicle when the towing vehicle moves backward, in the parking assistance device according to the second embodiment.

FIGS. 26 and 27 illustrate a display example indicating the case where a movement position prediction line 158 that is an example of the guide line generated by the guide line generation unit 150*b* is superimposed and displayed in the real image P2 of the screen 38*a* of the display unit 38 when the towing vehicle 10 can travel backward. When the guide line generation unit 150*b* acquires a signal (signal indicating R (reverse)) indicating that the towing vehicle 10 can travel backward based on the acquisition result of the shift position acquisition unit 144*c*, as illustrated in FIGS. 26 and 27, the movement position prediction line 158 indicating a trajectory (indicating a predicted movement position of the towing vehicle 10) of the towing vehicle 10 is generated in the real image P2. The movement position prediction line 158 may include a trajectory indicating a direction in which the rear wheel 13R of the towing vehicle 10 moves. In the following description, the movement position prediction line 158 including the trajectory on which the rear wheel 13R of the towing vehicle 10 moves is shown as an example. The movement position prediction line 158 is constituted by, for example, a tire trajectory line 158*a* indicating the predicted movement position of the rear wheel 13R based on the steering angle of the towing vehicle 10, a distance standard lines 158*b*, 158*c*, and 158*d* indicating the separation distance behind the rear bumper 10*a* of the towing vehicle 10, and the like. The distance standard line 158*b* is displayed at a separation distance of, for example, 0.5 m from the rear bumper 10*a*, the distance standard line 158*c* is displayed at a separation distance of, for example, 1.0 m from the rear bumper 10*a*, and the distance standard line 158*d* is displayed at a position corresponding to a separation distance of, for example, 2.5 m from the rear bumper 10*a*. In another embodiment, an extension of a vehicle center line extending in the front-rear direction of the towing vehicle 10 may be the movement position prediction line 158. In this case, one line may extend rearward from the rear bumper 10*a*, and lines similar to the distance standard lines 158*b*, 158*c*, and 158*d* may be provided on the line. In addition, the distance standard lines 158*b*, 158*c*, and 158*d* may be those imitating a rear corner portion of the rear bumper 10*a* or the towing vehicle 10.

In the case of the second embodiment, the guide line generation unit 150*b* can provide the driver with the recognition result of the recognition unit 146 by changing the display mode of the movement position prediction line 158 on the screen 38*a* of the display unit 38. FIG. 26 illustrates a display example of the screen 38*a* of the display unit 38 when the recognition unit 146 cannot recognize the towed vehicle 20 in the peripheral monitoring mode and in a state where the towing vehicle 10 can travel backward. In the case of FIG. 26, the recognition unit 146 cannot recognize the towed vehicle 20 even if the towed vehicle 20 is projected to the rear image captured by the imaging unit 14*b*. Therefore, in the overhead image P1, the trailer image 20*p* corresponding to the towed vehicle 20 is unclear but is displayed in a posture turning to the right. In addition, the towed vehicle 20 is unclear, but is displayed even in the real image P2. In the overhead image P1, the index 152 (trailer icon 152*a*) indicating that the towed vehicle 20 cannot be recognized is displayed, and the indicator 154 including the tractor indicator 154*a* and the trailer indicator 154*b* indicating a non-recognized state is displayed. In this case, the index 152 (trailer icon 152*a*) cannot recognize the towed vehicle 20 and since the connection angle θ cannot be detected, in a series state with the host vehicle image 10*p*, the index 152 (trailer icon 152*a*) is displayed, for example, in a state in which the luminance is lower than that of the host vehicle image 10*p* or a state in which the transmittance factor is higher than that of the host vehicle image 10*p*. When an angle detection sensor or the like is provided on the traction device 18 or the like, the recognition unit 146 cannot recognize the towed vehicle 20, but when the connection angle θ can be detected, the trailer icon 152*a* or the trailer indicator 154*b* may be displayed in an inclined posture according to the connection angle θ.

In this case, since the parking assistance system 50 (peripheral monitoring system) clearly indicates that the recognition unit 146 does not recognize the towed vehicle 20, when the towed vehicle is not connected to the real image P2, the movement position prediction line 158 in the normal display mode extending to a predetermined rear position (for example, 2.5 m) is displayed as displayed at the time of moving backward. That is, the movement position prediction line 158 including the distance standard lines 158*b*, 158*c*, and 158*d* is displayed. By performing such normal display of the movement position prediction line 158, it is possible to make it easier for the driver who checks the screen 38*a* to understand that the parking assistance system 50 does not recognize the towed vehicle 20. Note that even when there is no towed vehicle 20 around the towing vehicle 10, the recognition unit 146 cannot recognize the towed vehicle 20, so the guide line generation unit 150*b* generates the movement position prediction line 158 in the normal display mode and is superimposed on the real image P2.

On the other hand, in the shifted state to the peripheral monitoring mode, when the towing vehicle 10 can travel backward, in the case where the recognition unit 146 recognizes the towed vehicle 20, as illustrated in FIG. 27, the clear trailer image 20*p* corresponding to the towed vehicle 20 is displayed in the overhead image P1 in a posture in which the trailer image 20*p* is turned to the right. In addition, the towed vehicle 20 is clearly displayed even in the real image P2. In addition, the index 152 (trailer icon 152*a*) indicating that the towed vehicle 20 can be recognized is displayed in the overhead image P1. In this case, since the connection angle acquisition unit 144*d* can obtain the connection angle θ between the towing vehicle 10 and the towed vehicle 20 by the image processing, the index 152 (trailer icon 152*a*) can be connected to the host vehicle image 10*p* in a posture corresponding to the connection angle θ and displayed. Similarly, the indicator 154 including the tractor indicator 154*a* and the trailer indicator 154*b* indicating the recognition state can also be displayed in the connection posture based on the connection angle θ.

In this case, since the parking assistance system 50 (peripheral monitoring system) clearly indicates that the recognition unit 146 clearly indicates the towed vehicle 20, when the towed vehicle is not connected to the real image P2, the parking assistance system 50 displays the movement position prediction line 158 in a shortening display mode extending to a rear position (for example, 1.0 m) that is not superimposed with the towed vehicle 20. In this case, the movement position prediction line 158 displays only the distance standard line 158*c* and the tire trajectory line 158*a* extending to the distance standard line 158*c*. By displaying the movement position prediction line 158 in the shortening display mode, it is possible to make it easier for the driver who checks the screen 38*a* to understand that the parking assistance system 50 (peripheral monitoring system) does not recognize the towed vehicle 20. In addition, since the movement position prediction line 158 in the shortening display mode is not superimposed with the towed vehicle 20, it is possible to improve the visibility of the real image P2, and easily recognize the connection posture of the recognized towed vehicle 20 or the traveling direction when the towing vehicle 10 moves backward. In particular, since a tire trajectory line 158*a* of the movement position prediction line 158 in the shortening display mode that is not superimposed with the towed vehicle 20 is displayed with an appropriate length (for example, 1.0 m), it is easy to recognize the direction of the tire trajectory line 158*a*, it is possible to make it easier to understand the direction of the towing vehicle 10, that is, the current steering direction (steering angle direction) of the towing vehicle 10. As a result, in order to turn the towed vehicle 20 in a desired direction, it is possible to easily determine in which direction the steering angle is changed.

Returning to FIG. 19, when the monitoring request acquisition unit 144*e* acquires the shift request to the peripheral monitoring mode, the display switching unit 150*c* changes the screen 38*a* of the display unit 38 from the navigation screen or the audio screen of the normal display screen to the peripheral monitoring screen as illustrated in FIG. 22 or 27. In addition, when the monitoring request acquisition unit 144*e* acquires an end request of the peripheral monitoring mode, the display switching unit 150*c* returns from the peripheral monitoring screen to the normal display screen. In addition, in the peripheral monitoring mode, the screen 38*a* is switched so as to display the real image P2 captured by the imaging unit 14*b* or the imaging unit 14*a* corresponding to the traveling direction of the towing vehicle 10 based on the traveling direction of the towing vehicle 10 detected by the shift position acquisition unit 144*c*. In addition, the display switching unit 150*c* switches the display mode of the index 152 (trailer icon 152*a*), the display mode of the indicator 154, and the display mode of the movement position prediction line 158 based on the recognition result of the recognition unit 146.

An example of the display processing procedure in the periphery monitoring by the parking assistance system 50 (peripheral monitoring system) configured as described above will be described with reference to the flowchart in FIG. 28.

First, the CPU 60*a* checks whether the monitoring request acquisition unit 144*e* acquires the shift request to the peripheral monitoring mode by allowing the driver to operate, for example, of the operation input unit 42. When the monitoring request acquisition unit 144*e* does not acquire the shift request to the peripheral monitoring mode (No in S300), the CPU 60*a* once ends the flow. On the other hand, when the monitoring request acquisition unit 144*e* acquires the shift request to the peripheral monitoring mode (Yes in S300), the CPU 60*a* acquires the rear image captured by the imaging unit 14*b* and the front image captured by the imaging unit 14*a* via the image acquisition unit 144*a* (S302). Subsequently, the CPU 60*a* generates the overhead image P1 using the rear image acquired by the image acquisition unit 144*a* and the front image or the side image obtained by capturing an image around the towing vehicle 10, and displays the peripheral monitoring screen by the display switching unit 150*c* (S304). That is, the display switching unit 150*c* switches from the normal display screen (for example, navigation screen or audio screen) displayed on the screen 38*a* of the display unit 38 until the shift request to the peripheral monitoring mode is received to the peripheral monitoring screen constituted by, for example, the overhead image P1 and the real image P2 as illustrated in FIG. 21.

Subsequently, the CPU 60*a* acquires the steering angle of the towing vehicle 10 detected by the steering unit sensor 54 via the steering angle acquisition unit 144*b* (S306). Then, the CPU 60*a* causes the recognition unit 146 to execute the image processing on the rear image acquired by the image acquisition unit 144*a*, thereby performing the recognition of the towed vehicle 20. Then, when the towed vehicle 20 can be recognized by the recognition unit 146 (Yes in S308), the CPU 60*a* causes the index mode control unit 150*a* to display the trailer icon 152*a* indicating that the towed vehicle 20 is recognized as illustrated in FIG. 23 for the overhead image P1 generated by the image conversion unit 148 (S310). At this time, the connection angle acquisition unit 144*d* acquires the connection angle θ of the towed vehicle 20 with respect to the towing vehicle 10, as described with reference to FIG. 20. The index mode control unit 150*a* determines the posture (connection angle) of the trailer icon 152*a* displayed on the overhead image P1 with respect to the host vehicle image 10*p* based on the connection angle θ acquired by the connection angle acquisition unit 144*d*, and displays the determined posture in the state in which the host vehicle image 10*p* is connected to the trailer icon 152*a*. In addition, the index mode control unit 150*a* also determines the connection angle between the tractor indicator 154*a* and the trailer indicator 154*b* in the indicator 154 based on the connection angle θ acquired by the connection angle acquisition unit 144*d*. In this way, when the towed vehicle 20 can be recognized by the recognition unit 146, for example, when the connection angle θ≈0 between the towing vehicle 10 and the towed vehicle 20, the overhead image P1 becomes the image as illustrated in FIG. 22. In addition, when the connection angle θ≠0, the overhead image P1 becomes the image as illustrated in FIG. 27.

On the other hand, when the towed vehicle 20 cannot be recognized by the recognition unit 146 (No in S308), the CPU 60*a* causes the index mode control unit 150*a* not to display the trailer icon 152*a* indicating that the towed vehicle 20 is not recognized, in the overhead image P1 generated by the image conversion unit 148 (S312). In addition, the index mode control unit 150*a* displays the indicator 154 of only the tractor indicator 154*a* indicating that the towed vehicle 20 is not recognized in the overhead image P1 (see the overhead image P1 in FIG. 21). At this time, the index mode control unit 150*a* may display the trailer icon 152*a* indicating that the towed vehicle 20 is not recognized as illustrated in FIGS. 24 and 25 in the overhead image P1 (see the overhead image P1 in FIG. 26).

Subsequently, the CPU 60*a* checks the direction (forward or backward) in which the towing vehicle 10 is currently traveling based on the result acquired by the shift position acquisition unit 144*c*. In the case where the shift position acquisition unit 144*c* acquires a signal indicating that the shift operation unit moves the "R range" (Yes in S314) to cause the driver to move the towing vehicle 10 backward, when the recognition unit 146 recognizes the towed vehicle 20 (Yes in S316), the guide line generation unit 150*b* generates the guide line at the time of towing (S318). That is, as illustrated in FIG. 27, for example, the movement position prediction line 158 in the shortening display mode extending to a position 1.0 m behind the towing vehicle 10 is generated. In this case, the guide line generation unit 150*b* calculates the turning trajectory of the towing vehicle 10 based on the steering angle of the towing vehicle 10 acquired by the steering angle acquisition unit 144*b*, and calculates the tire trajectory line 158*a* of the rear wheel 13R of the towing vehicle 10, thereby determining a drawing direction of the movement position prediction line 158. On the other hand, in S316, when the recognition unit 146 does not recognize the towed vehicle 20 (No in S316), the guide line generation unit 150*b* generates the guide line at the time of non-towing (S320). That is, as illustrated in FIG. 26, for example, the movement position prediction line 158 in the normal display mode extending to a position 2.5 m behind the towing vehicle 10 is generated. Even in this case, the guide line generation unit 150*b* calculates the turning trajectory of the towing vehicle 10 based on the steering angle of the towing vehicle 10 acquired by the steering angle acquisition unit 144*b*, and calculates the tire trajectory line 158*a* of the rear wheel 13R of the towing vehicle 10, thereby determining the drawing direction of the movement position prediction line 158. When the movement position prediction line 158 is generated by the guide line generation unit 150*b*, the CPU 60*a* superimposes the movement position prediction line 158 (guide line) on the real image P2 indicating the rear side (S322), and displays the screen 38*a* as illustrated in FIG. 26 or 27 on the display unit 38.

Then, when the monitoring request acquisition unit 144*e* acquires the end request of the peripheral monitoring mode (Yes in S324), for example, when the driver operates an end switch by the operation input unit 42, and the like, the CPU 60*a* causes the display switching unit 150*c* to display (return) the normal display screen on (to) the screen 38*a* of the display unit 38 (S326). For example, the screen 38*a* is switched to the navigation screen or the audio screen, and a series of peripheral monitoring processing once ends.

In S324, when the monitoring request acquisition unit 144*e* does not acquire the end request of the peripheral monitoring mode (No in S324), the CPU 60*a* proceeds to S302 and continues the peripheral monitoring processing.

In S314, in the case where the driver does not move the towing vehicle 10 backward, that is, in the case where the shift position acquisition unit 144*c* acquires the signal indicating that the shift operation unit moves to ranges other than the "R range" (No in S314), the guide line generation unit 150b generates the standard line 156 for front display, and superimposes and displays the generated standard line 156 on the front real image P2 (S328). That is, the screen 38a as illustrated in FIG. 21 or 22 is displayed on the display unit 38. Even in this case, the guide line generation unit 150b calculates the turning trajectory of the towing vehicle 10 based on the steering angle of the towing vehicle 10 acquired by the steering angle acquisition unit 144b, thereby determining the drawing direction of the standard line 156. After the standard line 156 is displayed on the screen 38a, the CPU 60a proceeds to the process of S324, determines whether the peripheral monitoring processing ends, and executes the above-described processing.

Figure 28:
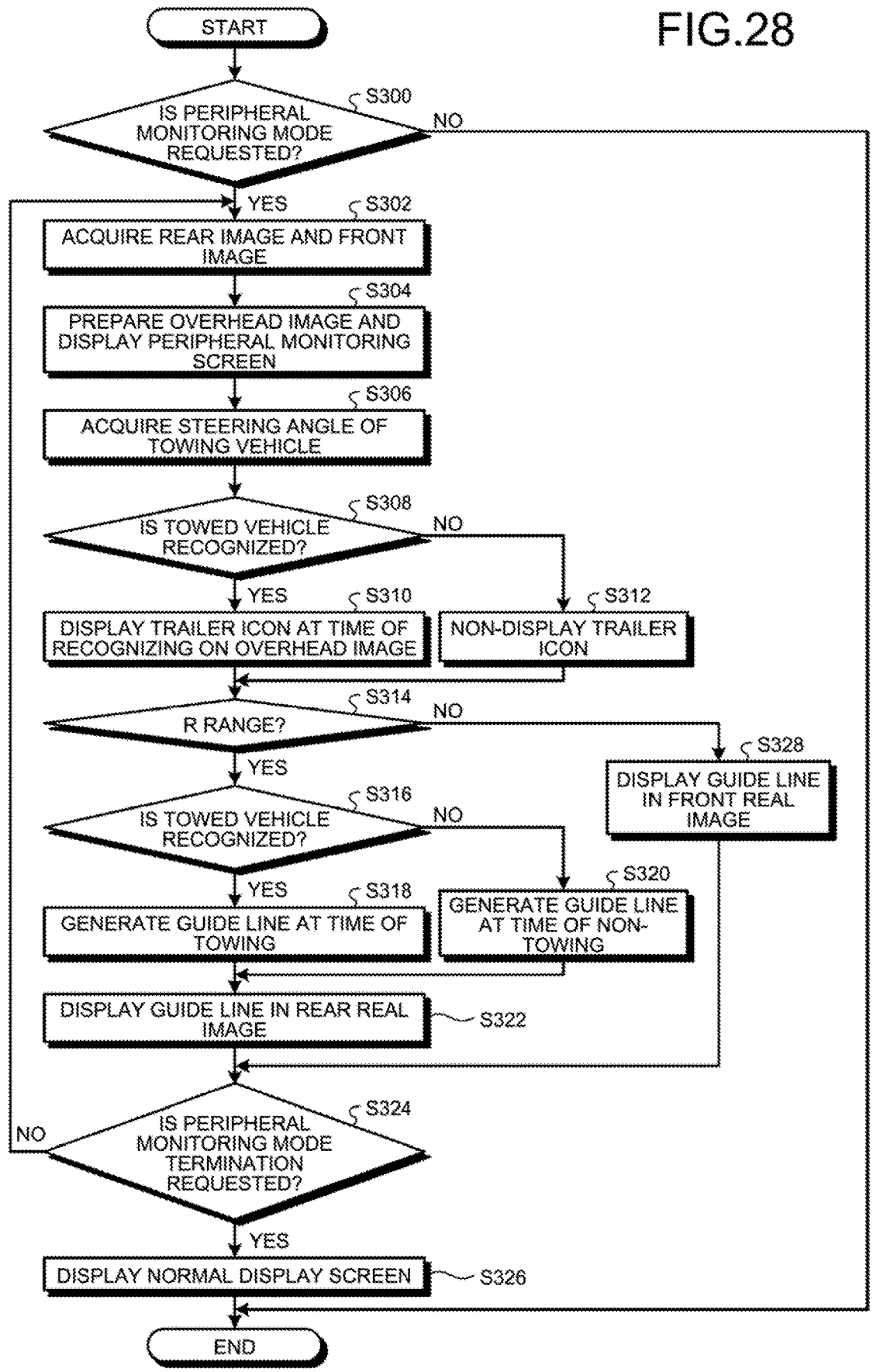
FIG. 28 is a flowchart for describing an example of a display procedure of the index by the parking assistance device according to the second embodiment.

The flowchart illustrated in FIG. 28 is an example, and it is sufficient that the parking assistance system 50 (peripheral monitoring system) can notify the driver of the information indicating whether the towed vehicle 20 is recognized, and processing steps can be interchanged, increased or decreased, or the like, as appropriate, and as a result, the same effect can be obtained.

As described above, according to the parking assistance system 50 (peripheral monitoring system) of the second embodiment, it is specified whether the towed vehicle 20 can be recognized in the parking assistance system 50, so the control (processing) situation of the parking assistance system 50 can be easily understood and the driver can be easily given the sense of security.

In the above-described second embodiment, an example of notifying whether the parking assistance system 50 recognizes the towed vehicle 20 using the display unit 38 has been described, but for example, may simply display the contents to be displayed on the overhead image P1 using another display devices, and as a result, the same effect can be obtained. In addition, in the case of notifying whether the parking assistance system 50 recognizes the towed vehicle 20, an audible notification may performed by voice using the voice output unit 40 in addition to the above-described visual notification, and the driver can more clearly understand the recognition state of the towed vehicle 20 in the parking assistance system 50.

In the above-described second embodiment, an example in which the display area of the overhead image P1 is displayed smaller than the display area of the real image P2 on the display unit 38 has been described, but the overhead image P1 may be displayed larger than the real image P2. In this case, it is possible to make the driver easily understand the recognition state of the towed vehicle 20 more clearly. In addition, the overhead image P1 may be displayed on another display device, and only the real image P2 may be displayed on the display unit 38. In this case, it is possible to secure the wide display area of the real image P2, and it is possible to improve the visibility of the real image P2. In addition, when other display devices are arranged at the position where the driver can visually recognize the overhead image P1 without moving the driver's line of sight too much during driving (for example, dashboard panel of the dashboard), the visibility of the overhead image P1 can be improved. Further, only the overhead image P1 may be displayed on the display unit 38, and similarly, the visibility of the overhead image P1 can be improved.

OTHER EXAMPLES

The display mode according to the first embodiment and the display mode according to the second embodiment as described above may each be displayed on the display unit 38 or the like as independent display modes, or may also displayed in the state in which the display mode according to the first embodiment and the display mode according to the second embodiment are combined. By displaying the display mode in the first embodiment and the display mode in the second embodiment in the combined state, the index 152 described in the second embodiment can be provided to the driver (user) in a more easily recognized state. In the case where the display mode in the first embodiment and the display mode in the second embodiment are displayed in the combined state, the processing in the recognition unit 146 of the second embodiment may be executed by the towing determination unit 78 in the first embodiment. In addition, the processing in the control unit 150 of the second embodiment may be executed by the display image generation unit 90. Note that whether the display mode in the first embodiment and the display mode in the second embodiment are displayed independently or combined and displayed can be selected by allowing the driver (user) to use the operation input unit 42 or the like, or can be set as the initial setting.

The parking assistance program (peripheral monitoring program) executed by the CPU 60a of the first embodiment and the second embodiment may be a file in an installable format or an executable format, and may be configured to be provided by being recorded in computer-readable recording media such as a CD-ROM, a flexible disk (FD), a CD-R, and a digital versatile disk (DVD).

Further, the parking assistance program (peripheral monitoring program) may be stored on a computer connected to a network such as the Internet and provided by being downloaded via the network. Further, the parking assistance program (peripheral monitoring program) executed in the first and second embodiments may be provided or distributed via a network such as the Internet.

Although the embodiments and the modified examples of the present invention have been described, the embodiments and the modified examples are presented as examples and are not intended to limit the scope of the invention. These new embodiments can be implemented in other various forms, and various omissions, replacements, and changes can be made without departing from the spirit of the invention. These embodiments or modified examples are included in the scope or gist of the invention, and are also included in the invention described in the claims and equivalents thereof.

EXPLANATIONS OF LETTERS OR NUMERALS

10 Towing vehicle
20 Towed vehicle
50 Parking assistance system
60 Parking assistance device
78 Towing determination unit
86 Overhead image generation unit
88 Overhead image display range setting unit
90 Display image generation unit
94 Parking assistance program
Ar1 First display range
Ar2 Second display range
BV Overhead image
IMc Overhead image for display
IMd Peripheral image
IMe Display image
IMj Target position image
SL Assistance line

The invention claimed is:

1. A parking assistance device comprising:
at least one processor configured to implement:
an overhead image generation unit that generates an overhead image from a captured image obtained by capturing an image around a towing vehicle;
a towing determination unit that determines whether the towing vehicle tows a towed vehicle;
an overhead image display range setting unit that selects a trimming range from a plurality of display ranges at least including a first display range and a second display range wider than the first display range in a direction transverse to a moving direction of the towing vehicle; and
a display image generation unit that generates an overhead image for display by trimming the trimming range of the overhead image, and generates a display image including the overhead image for display on which the image of the towing vehicle is superimposed,
wherein the overhead image display range setting unit selects the first display range when the towing determination unit determines that the towing vehicle does not tow the towed vehicle, and selects the second display range when the towing determination unit determines that the towing vehicle tows the towed vehicle.

2. The parking assistance device according to claim 1, wherein the overhead image display range setting unit sets a center of the trimming range at a first front-rear position behind a center of the overhead image when the overhead image display range setting unit selects the second display range and the towing vehicle moves backward.

3. The parking assistance device according to claim 1, wherein the overhead image display range setting unit sets the center of the trimming range at a second front-rear position in front of the center of the overhead image when the overhead image display range setting unit selects the second display range and the towing vehicle moves forward.

4. The parking assistance device according to claim 1, wherein the overhead image display range setting unit sets the center of the trimming range at the second front-rear position in front of the center of the overhead image when the overhead image display range setting unit selects the second display range, a parking mode for setting a target parking position and assisting parking is set, and the towing vehicle moves forward, and
the display image generation unit superimposes an image of the target parking position on the overhead image for display when the parking mode is set.

5. The parking assistance device according to claim 4, wherein the overhead image display range setting unit sets the center of the trimming range closer to the target parking position selected within the overhead image, in a left-right direction when the overhead image display range setting unit selects the second display range, and the target parking position is selected.

6. The parking assistance device according to claim 1, wherein the overhead image display range setting unit sets the center of the trimming range at the first front-rear position behind the center of the overhead image when the overhead image display range setting unit selects the second display range, a parking mode for setting a target parking position and assisting parking is set, and the towing vehicle moves backward, and
the display image generation unit superimposes an image of the target parking position on the overhead image for display when the parking mode is set.

7. The parking assistance device according to claim 6, wherein the overhead image display range setting unit sets the center of the trimming range closer to the target parking position selected within the overhead image, in a left-right direction when the overhead image display range setting unit selects the second display range, and the target parking position is selected.

8. The parking assistance device according to claim 1, wherein the display image generation unit generates the display image including a peripheral image in a traveling direction of the front-rear direction of the towing vehicle, together with the overhead image for display.

9. The parking assistance device according to claim 1, wherein the display image generation unit determines whether the towed vehicle is detected based on a determination result of the towing determination unit, and determines and displays a display mode of an index indicating a state of the towing vehicle or the towed vehicle according to the determination result.

10. The parking assistance device according to claim 9, wherein the display image generation unit does not display the index when the towing determination unit does not recognize the towed vehicle.

11. The parking assistance device according to claim 9, wherein when the towing vehicle moves backward based on a steering angle of the towing vehicle, the display image generation unit superimposes and displays, as the index, a movement position prediction line based on a current steering angle of the towing vehicle, on the captured image, and makes a display mode of the movement position prediction line different between a time when the towed vehicle is recognized and a time when the towed vehicle is not recognized.

12. The parking assistance device according to claim 9, wherein when displaying, as the index, a vehicle mark indicating the towed vehicle, the display image generation unit superimposes and displays the vehicle mark in a display corresponding position of the towed vehicle in a vehicle peripheral image based on an image around the towing vehicle.

13. A parking assistance device, comprising:
at least one processor configured to implement:
an acquisition unit that acquires a captured image obtained by capturing an image of a rear area of a towing vehicle from the towing vehicle to which a towed vehicle is connectable;
a recognition unit that recognizes the towed vehicle in a connected state based on the captured image; and
a control unit that determines whether the towed vehicle is detected based on a recognition result of the recognition unit, and determines and displays a display mode of an index indicating a state of the towing vehicle or the towed vehicle according to the determination result,
wherein when the towing vehicle moves backward based on a steering angle of the towing vehicle, the control unit superimposes and displays, as the index, a movement position prediction line based on a current steering angle of the towing vehicle on the captured image, and makes a display mode of the movement position prediction line different between a time when the towed vehicle is recognized and a time when the towed vehicle is not recognized.

14. The parking assistance device according to claim 13, wherein the control unit does not display the index when the recognition unit does not recognize the towed vehicle.

15. The parking assistance device according to claim 13, wherein the acquisition unit further acquires an image around the towing vehicle, when displaying, as the index, a vehicle mark indicating the towed vehicle, the control unit superimposes and displays the vehicle mark in a display corresponding position of the towed vehicle in a vehicle peripheral image based on the peripheral image.

16. A parking assistance device comprising:

at least one processor configured to implement:

an overhead image generation unit that generates an overhead image from a captured image obtained by capturing an image around a towing vehicle; a towing determination unit that determines whether the towing vehicle tows a towed vehicle; an overhead image display range setting unit that selects a trimming range from a plurality of display ranges at least including a first display range and a second display range wider than the first display range; and a display image generation unit that generates an overhead image for display by trimming the trimming range of the overhead image, and generates a display image including the overhead image for display on which the image of the towing vehicle is superimposed, wherein the overhead image display range setting unit selects the first display range when the towing determination unit determines that the towing vehicle does not tow the towed vehicle, and selects the second display range when the towing determination unit determines that the towing vehicle tows the towed vehicle, wherein the overhead image display range setting unit sets the center of the trimming range at the second front-rear position in front of the center of the overhead image when the overhead image display range setting unit selects the second display range, a parking mode for setting a target parking position and assisting parking is set, and the towing vehicle moves forward, and wherein the overhead image display range setting unit sets the center of the trimming range at the first front-rear position behind the center of the overhead image when the overhead image display range setting unit selects the second display range, a parking mode for setting a target parking position and assisting parking is set, and the towing vehicle moves backward.

\* \* \* \* \*